US012621397B2

(12) United States Patent
Tanaka et al.

(10) Patent No.: US 12,621,397 B2
(45) Date of Patent: May 5, 2026

(54) IMAGE PROCESSING APPARATUS AND METHOD FOR CONTROLLING DELETION OF SETTING HISTORY

(71) Applicant: SHARP KABUSHIKI KAISHA, Osaka (JP)

(72) Inventors: Kenji Tanaka, Osaka (JP); Harunobu Mori, Osaka (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 707 days.

(21) Appl. No.: 17/980,433

(22) Filed: Nov. 3, 2022

(65) Prior Publication Data

US 2023/0156132 A1      May 18, 2023

(30) Foreign Application Priority Data

Nov. 18, 2021      (JP) ................................. 2021-188221

(51) Int. Cl.
*H04N 1/00*          (2006.01)
*H04N 1/44*          (2006.01)

(52) U.S. Cl.
CPC ....... *H04N 1/0097* (2013.01); *H04N 1/00517* (2013.01); *H04N 1/4413* (2013.01); *H04N 2201/0094* (2013.01)

(58) Field of Classification Search
CPC ............. H04N 1/0097; H04N 1/00517; H04N 1/4413; H04N 2201/0094; H04N 1/00832; H04N 1/00326; Y02D 10/00

USPC ......................................................... 358/1.13
See application file for complete search history.

(56) References Cited

U.S. PATENT DOCUMENTS

| | | | |
|---|---|---|---|
| 7,221,885 B2 * | 5/2007 | Sato ................... | G03G 15/5016 |
| | | | 399/83 |
| 2014/0293315 A1 | 10/2014 | Takarabe et al. | |
| 2016/0006887 A1 * | 1/2016 | Takenaka ........... | H04N 1/00925 |
| | | | 358/1.13 |
| 2018/0217797 A1 * | 8/2018 | Inoue ................. | H04N 1/00408 |
| 2019/0384552 A1 * | 12/2019 | Sakaguchi ............ | G06F 3/1254 |

FOREIGN PATENT DOCUMENTS

| | | |
|---|---|---|
| CN | 1719921 A | 1/2006 |
| CN | 104104811 A | 10/2014 |
| JP | 2005-153346 A | 6/2005 |
| JP | 2010201931 A | 9/2010 |

OTHER PUBLICATIONS

Machine translation of First Office Action issued on Mar. 12, 2025 for Chinese Patent Application No. 202211441928.4.

* cited by examiner

*Primary Examiner* — Neil R Mclean
(74) *Attorney, Agent, or Firm* — ScienBiziP, P.C.

(57)      ABSTRACT

An image processing apparatus includes a storage capable of storing a setting history of a job related to image processing, and a controller that accepts a deletion request of the setting history, in which, when the deletion request of the setting history is accepted, the controller identifies the setting history to be deleted as a deletion target according to whether a user authentication function is effective, and performs deletion control of the identified setting history.

12 Claims, 21 Drawing Sheets

| SETTING HISTORY | | | | |
|---|---|---|---|---|
| HISTORY ID | EXECUTION DATE AND TIME | JOB TYPE | DISPLAYED SETTING VALUE | SETTING VALUE FILE NAME |
| 0099 | 2020/02/22 20:20 | COPY | COLOR MODE : FULL COLOR, TWO-SIDED COPY : ONE-SIDED → ONE-SIDED, COPY DENSITY : AUTO, ····· | 0099.config |
| 0098 | 2020/02/22 19:19 | E-mail | DESTINATION.AAA@sampleA.co.jp, BBB@sampleB.co.jp, FORMAT : HIGHLY COMPRESSED PDF, RESOLUTION : 600x600dpi, FUNCTION : SKIP BLANK PAGE, ····· | 0098.config |
| 0097 | 2020/02/22 18:18 | FAX | DESTINATION : 0123456789, sample CO., LTD., TRANSMISSION SIZE : A3, ORIGINAL : TWO-SIDED → ONE-SIDED, FUNCTION : TIME DESIGNATION, ····· | 0097.config |
| 0096 | 2020/02/22 18:10 | Scan to SMB | SAVE TO : \\USERFOLDER\TEST, FORMAT : jpeg, FUNCTION : MIXED ORIGINALS, ····· | 0096.config |
| 0095 | 2020/02/12 09:01 | E-mail | DESTINATION : sample@local, FORMAT : ENCRYPTED PDF, RESOLUTION : 300x300dpi, FUNCTION.MIXED ORIGINALS, SKIP BLANK PAGE, ····· | 0095.config |
| 0094 | 2020/02/11 20:30 | COPY | COLOR MODE : FULL COLOR, TWO-SIDED COPY : ONE-SIDED → ONE-SIDED, COPY DENSITY : AUTO, ····· | 0094.config |
| 0093 | 2020/02/11 20:24 | FAX | DESTINATION : 0123456789, sample CO., LTD., TRANSMISSION SIZE : A3, ORIGINAL : TWO-SIDED → ONE-SIDED, FUNCTION : TIME DESIGNATION, ····· | 0093.config |
| 0092 | 2020/02/11 20:20 | COPY | COLOR MODE : BLACK AND WHITE BINARY, TWO-SIDED COPY : ONE-SIDED → TWO-SIDED, COPY DENSITY : LETTER + PICTURE ON PRINTING PAPER, ····· | 0092.config |
| 0091 | 2020/02/11 17:10 | Scan to SMB | SAVE TO : STANDARD FOLDER, FORMAT : bmp, FUNCTION : MIXED ORIGINALS, ····· | 0091.config |
| 0090 | 2020/02/11 13:20 | FAX | DESTINATION : 0987654321, TRANSMISSION SIZE : A4, ORIGINAL : ONE-SIDED → ONE-SIDED, ····· | 0090.config |

FIG. 3B

```
0098.congig                                    _ ☐ ✕
○○○  △△△  ✕✕✕

DESTINATION : AAA@sampleA.co.jp, BBB@sampleB.co.jp,
FORMAT : HIGHLY COMPRESSED PDF, RESOLUTION :
600x600dpi, PAGE CONSOLIDATION : off, CARD SCAN : off, SKIP
BLANK PAGE : on, MIXED ORIGINALS : on, NUMBER OF
ORIGINALS : off, TEST COPY : off, CONSOLIDATED COPY : off,
BULK ORIGINAL MODE : off, MULTICROP SCAN/PICTURE CROP :
off, ····
```

FIG. 4

| JOB HISTORY | | | | | |
|---|---|---|---|---|---|
| JOB ID | HISTORY ID | EXECUTION DATE AND TIME | JOB TYPE | USER NAME | STATUS |
| 0099 | 0099 | 2020/02/22 20:20 | COPY | aaaaa | COMPLETED |
| 0098 | 0098 | 2020/02/22 19:19 | E-mail | aaaaa | COMPLETED |
| 0097 | 0097 | 2020/02/22 18:18 | FAX | aaaaa | COMPLETED |
| 0096 | 0096 | 2020/02/22 18:10 | Scan to SMB | aaaaa | COMPLETED |
| 0095 | 0095 | 2020/02/12 09:01 | E-mail | ccccc | COMPLETED |
| 0094 | 0094 | 2020/02/11 20:30 | COPY | bbbbb | COMPLETED |
| 0093 | 0093 | 2020/02/11 20:24 | FAX | bbbbb | COMPLETED |
| 0092 | 0092 | 2020/02/11 20:20 | COPY | ccccc | COMPLETED |
| 0091 | 0091 | 2020/02/11 17:10 | Scan to SMB | aaaaa | COMPLETED |
| 0090 | 0090 | 2020/02/11 13.20 | FAX | | COMPLETED |

FIG. 5

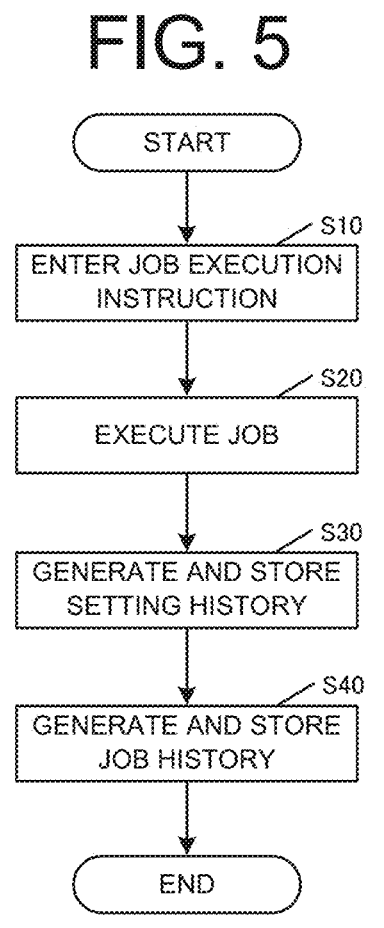

```
        ( START )
            │
            ▼                    ⌐ S10
  ┌─────────────────────┐
  │ ENTER JOB EXECUTION │
  │    INSTRUCTION      │
  └─────────────────────┘
            │
            ▼                    ⌐ S20
  ┌─────────────────────┐
  │    EXECUTE JOB      │
  └─────────────────────┘
            │
            ▼                    ⌐ S30
  ┌─────────────────────┐
  │ GENERATE AND STORE  │
  │   SETTING HISTORY   │
  └─────────────────────┘
            │
            ▼                    ⌐ S40
  ┌─────────────────────┐
  │ GENERATE AND STORE  │
  │    JOB HISTORY      │
  └─────────────────────┘
            │
            ▼
        (  END  )
```

Figure 7:
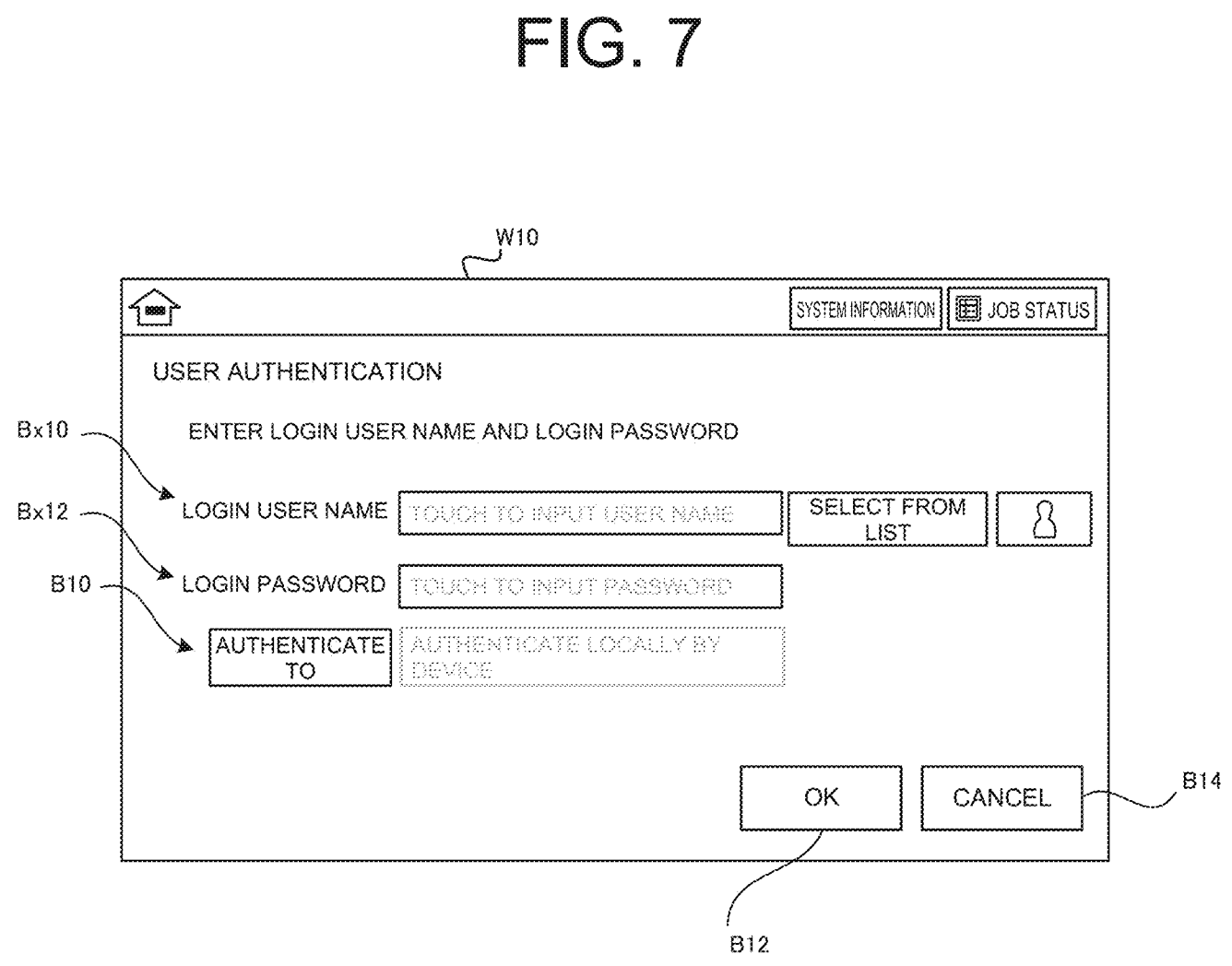

SYSTEM INFORMATION | JOB STATUS

USER AUTHENTICATION

ENTER LOGIN USER NAME AND LOGIN PASSWORD

LOGIN USER NAME        TOUCH TO INPUT USER NAME        SELECT FROM LIST

LOGIN PASSWORD         TOUCH TO INPUT PASSWORD

AUTHENTICATE TO        AUTHENTICATE LOCALLY BY DEVICE

OK        CANCEL

Figure 8:
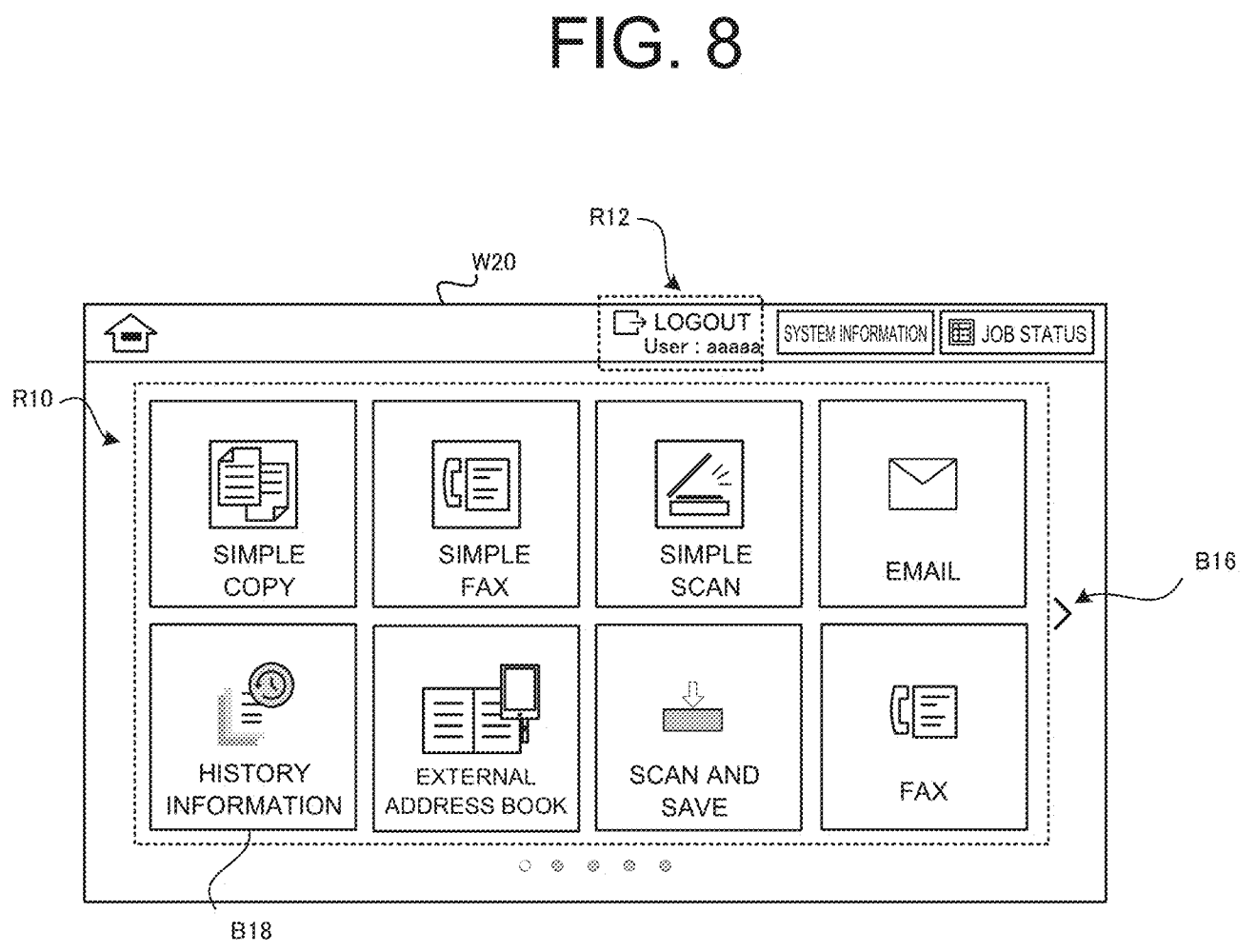

LOGOUT
User : aaaaa

SYSTEM INFORMATION

JOB STATUS

SIMPLE COPY

SIMPLE FAX

SIMPLE SCAN

EMAIL

HISTORY INFORMATION

EXTERNAL ADDRESS BOOK

SCAN AND SAVE

FAX

| SETTING HISTORY – PINNING MANAGEMENT TABLE | | | |
|---|---|---|---|
| HISTORY ID | SETTING VALUE FILE NAME | PINNING | PINNING PRIORITY |
| 0099 | 0099.config | Yes | 2 |
| 0098 | 0098.config | Yes | 1 |
| 0097 | 0097.config | Yes | 4 |
| 0096 | 0096.config | Yes | 3 |
| 0091 | 0091.config | Yes | 5 |

FIG. 16B

```
0098.config                                    _ □ ×
○○○ △△△ × × ×
────────────────────────────────────────────
DESTINATION : AAA@sampleA.co.jp, BBB@sampleB.co.jp,
FORMAT : HIGHLY COMPRESSED PDF, RESOLUTION :
600x600dpi, PAGE CONSOLIDATION : off. CARD SCAN : off, SKIP
BLANK PAGE : on, MIXED ORIGINALS : on, NUMBER OF
ORIGINALS : off, TEST COPY : off, CONSOLIDATED COPY : off,
BULK ORIGINAL MODE : off, MULTICROP SCAN/PICTURE CROP :
off, · · · ·, PINNING : On
```

IMAGE PROCESSING APPARATUS AND METHOD FOR CONTROLLING DELETION OF SETTING HISTORY

BACKGROUND OF THE INVENTION

Field of the Invention

The present disclosure relates to an image processing apparatus and the like.

Description of the Background Art

Some image processing apparatuses such as multifunctional peripherals store setting values related to jobs executed in a mode such as copy mode, fax mode, and scan mode, as a setting history.

In recent years, attempts have been made to reduce time and efforts of a user involved in job execution by using stored setting histories. Specifically, the image processing apparatus displays the setting histories on a display to allow the user to make a selection. An image processing apparatus that has accepted a selection of the setting history by the user can easily reproduce a job corresponding to the setting history by executing the job in accordance with the setting values linked to the setting history.

Some of these image processing apparatuses include a delete operation button or the like for accepting a deletion request of the setting history on a display screen displaying the setting histories. For example, it is conventionally known that an authenticated user specifies a specific operation history or all operation histories of his/her own operation histories, and operates the history delete button to delete the designated operation history/histories from an HDD section.

However, such conventional techniques delete the setting histories from the storage in a batch by operating the delete operation button. Therefore, it has not been possible to control the deletion of the setting histories by reflecting the operation state or setting state at the time of the deletion request, such as whether the user authentication function is effective or the state in which a specific setting such as pinning to fix display on the display screen is applied to the setting histories.

It is an object of the present disclosure to provide an image processing apparatus and the like capable of performing deletion control of a setting history upon reflecting the operation state or setting state upon acceptance of a deletion request of the setting history.

SUMMARY OF THE INVENTION

In order to solve the above problem, an image processing apparatus according to the present disclosure includes a storage capable of storing a setting history of a job related to image processing, and a controller that accepts a deletion request of the setting history, in which when the deletion request of the setting history is accepted, the controller identifies the setting history to be deleted according to whether a user authentication function is effective, and performs deletion control on the identified setting history.

A method for deleting a setting history according to the present disclosure includes storing a setting history of a job related to image processing, and controlling for accepting a deletion request of the setting history, in which when the deletion request of the setting history is accepted, the controlling includes identifying the setting history to be deleted according to whether a user authentication function is effective, and performing deletion control on the identified setting history.

According to the present disclosure, it is possible to provide image processing apparatus and the like capable of performing deletion control of the setting history by reflecting the operation state or setting state at the time of the deletion request of the setting history.

BRIEF DESCRIPTION OF THE DRAWINGS

FIG. 2 illustrates a functional structure of the multifunctional peripheral according to the first embodiment;

FIGS. 3A and 3B each illustrate an example of a data structure of the setting history according to the first embodiment;

FIG. 4 is a view explaining an example of a data structure of a job history according to the first embodiment;

FIG. 5 is a flowchart explaining a process flow of the first embodiment;

FIG. 7 is a view illustrating an operation example according to the first embodiment;

FIG. 8 is a view illustrating an operation example according to the first embodiment;

FIGS. 16A and 16B are views each illustrating an operation example according to the second embodiment;

DESCRIPTION OF THE PREFERRED EMBODIMENTS

Embodiments of the present disclosure will be described below with reference to the accompanying drawings. In the present disclosure, a multifunctional peripheral capable of performing, in a single housing, jobs relating to, for example, copying, faxing, image transmission, or the like is described as a form of the image processing apparatus. The embodiments described below are presented as examples for explaining the present disclosure, and therefore the technical scope thereof as recited in the appended claims is not limited by the following description.

1. First Embodiment

A first embodiment is to identify a deletion target of the setting history according to whether the authentication function is effective when a deletion request of the setting history is accepted.

1.1 Functional Structure

Figure 1:
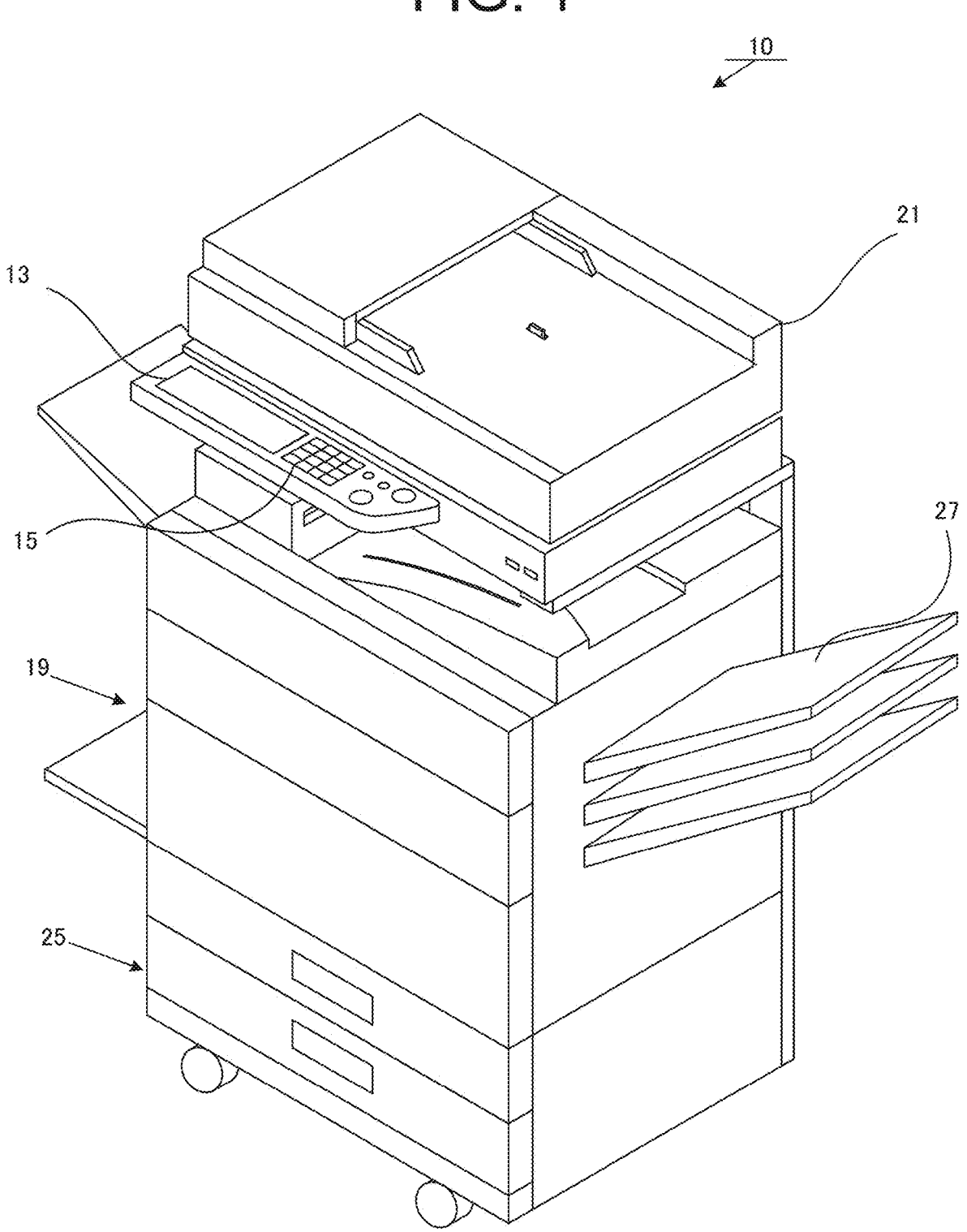
FIG. 1 is a perspective view illustrating the exterior of a multifunctional peripheral according to a first embodiment.
Figure 2:
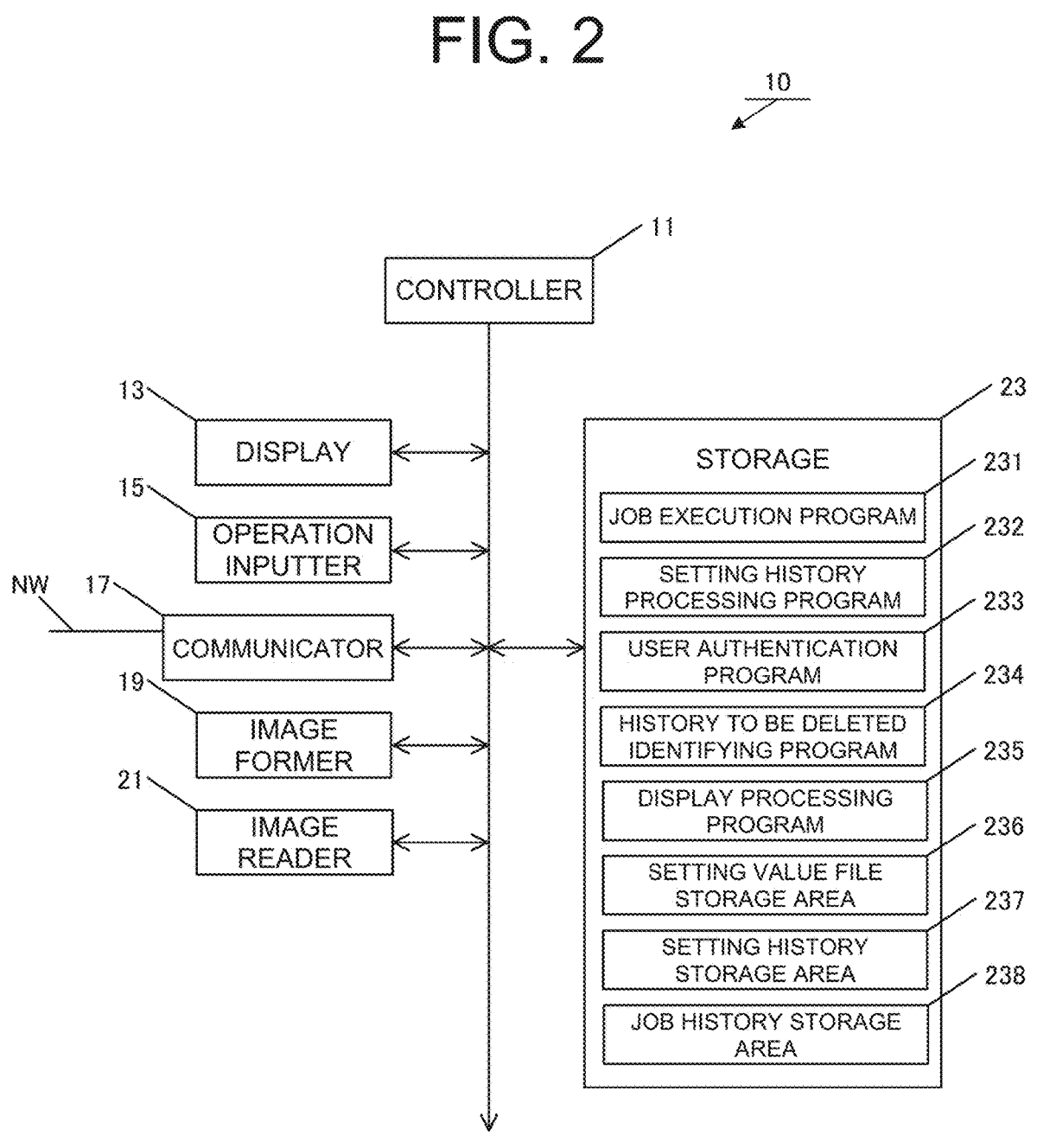

A functional structure of a multifunctional peripheral 10 according to the first embodiment is described with reference to FIGS. 1 and 2. FIG. 1 is a perspective view of the exterior of the multifunctional peripheral 10 schematically explaining an overall structure thereof according to the first embodiment. FIG. 2 illustrates a functional structure of the multifunctional peripheral 10. The multifunctional peripheral 10 includes a controller 11, a display 13, an operation inputter 15, a communicator 17, an image former 19, an image reader 21, and a storage 23.

The controller 11 controls the entire multifunctional peripheral 10. The controller 11 includes one or more computing devices (for example, a central processing unit (CPU) or the like). The controller 11 implements its functions by invoking and executing various programs stored in the storage 23.

The display 13 displays various kinds of information to the user or the like. The display 13 may be provided as a liquid crystal display (LCD), an organic electro-luminescence (EL) display, or the like.

The operation inputter 15 accepts input of information by the user or the like. The operation inputter 15 may be provided as hard keys (for example, a numeric keypad), buttons, or the like. The operation inputter 15 can also be provided as a touch panel that allows input via the display 13. In that case, the touch panel can employ a common method such as a resistive, infrared, electromagnetic induction, or capacitive input method.

The communicator 17 includes either a wired or wireless interface or both interfaces to communicate with other devices via a network (NW) such as a local area network (LAN), a wide area network (WAN), the Internet, telephone lines, fax lines, or the like.

The image former 19 forms images based on the image data on paper as a recording medium. The image former 19 feeds paper from a paper feeder 25, forms an image based on the image data on the paper, and then discharges the paper to a paper discharger 27. The image former 19 can include, for example, a laser printer using electrophotography. In that case, the image former 19 forms images using toners supplied from toner cartridges, which are not illustrated, each toner corresponding to a toner color (for example, cyan, magenta, yellow, or black).

The image reader 21 scans and reads the image of an original to be read and generates the image data. The image reader 21 can be provided as a scanner including an image sensor such as a charge coupled device (CCD) or a contact image sensor (CIS). The structure of the image reader 21 is not limited, but the image reader 21 needs to generate image data by reading a reflected light image from the original image using the image sensor.

The storage 23 stores various programs and data necessary for the operation of the multifunctional peripheral 10. The storage 23 can include a storage such as a random access memory (RAM), a hard disk drive (HDD), a solid state drive (SSD), a read only memory (ROM), or the like.

In the first embodiment, the storage 23 stores a job execution program 231, a setting history processing program 232, a user authentication program 233, a history to be deleted identifying program 234, and a display processing program 235, and reserves a setting value file storage area 236, a setting history storage area 237, and a job history storage area 238.

The job execution program 231 is a program read by the controller 11 to perform processing associated with the execution of each function, such as copying, faxing, and image data transmission, on a job-by-job basis. The controller 11 that has read the job execution program 231 executes the job by controlling the display 13, the operation inputter 15, the communicator 17, the image former 19, the image reader 21, or the like that function as job executers. The controller 11 that has invoked the job execution program 231 can execute various types of jobs in accordance with the setting values included in the setting value file included in the setting history.

The setting history processing program 232 is a program read by the controller 11 when acquiring the setting values pertaining to the execution of the job, generation of the setting history, or execution of various types of processing for the setting history. The controller 11 that has read the setting history processing program 232 acquires the setting values pertaining to the execution of the job and generates a setting value file accommodating the setting values. The controller 11 then stores the generated setting value file in the setting value file storage area 236. In addition, the controller 11 generates the setting history by linking the setting value file to identification information (for example, a history ID) to identify to which job it is related. The controller 11 then stores the generated setting value file in the setting history storage area 237.

The user authentication program 233 is a program read by the controller 11 to authenticate a user who logs in to the multifunctional peripheral 10. The controller 11 reads the user authentication program 233 to enable the user authentication function. For example, the user authentication program 233 could be read automatically at device startup or, alternatively, an operation button could be provided on the system settings screen or the like to enable or disable (turn on or off) the user authentication function, so that the user authentication program 233 can be read when the user operates the button. Here, the system settings screen is a settings screen that accepts input settings of the apparatus settings (for example, operating conditions, environmental conditions, authenticated user registration, or the like) of the multifunctional peripheral 10, and is generally managed by a user who has an administrator right (an administrative user).

The controller 11 that has read the user authentication program 233 displays a user login screen which will be described later on the display 13. For example, the controller 11 stores the login user name and login password in association in advance, and performs user login authentication by matching the login user name and login password entered via the user login screen. In the present disclosure, a logged-in authenticated user may be denoted as an authenticated user. In addition to knowledge authentication based on the input of the login user name and login password, the login authentication of the user can also be performed by means of possession authentication using a token, a key, an IC card, a smartphone, or other terminal devices, or by biometric authentication using, for example, fingerprint, palm print, or face recognition.

The history to be deleted identifying program 234 is a program read by the controller 11 when a delete all button displayed on a setting history display screen which will be described later is tapped. The controller 11 that has read the history to be deleted identifying program 234 identifies the setting history to be deleted according to whether the user authentication function is effective. In the first embodiment, when the user authentication function is effective, the controller 11 identifies the setting histories pertaining to the jobs executed by the user who has operated the delete all button as the setting histories to be deleted. On the other hand, when the user authentication function is ineffective, the controller 11 identifies the setting histories pertaining to the jobs that have been executed before the delete all button is operated as the setting histories to be deleted.

The display processing program 235 is a program read by the controller 11 in displaying, on the display 13, a screen such as a display screen that displays a list of setting histories, a settings screen that accepts input of various setting values, execution instructions, termination instructions, or the like related to execution of jobs, a basic screen (for example, a home screen) that displays the settings screen in a switchable manner, or a login screen used for user authentication.

The setting value file storage area 236 is a storage area for storing the setting value file generated by the controller 11 that has read the setting history processing program 232. Setting values include, for example, color mode, resolution, format, density, or the like set by the user, or default values retained in the apparatus itself or the like. The controller 11 that has read the job execution program 231 acquires the setting value file linked to the setting history to be executed from the setting value file storage area 236 and executes the job based on the setting values included in the setting value file.

The setting history storage area 237 is a storage area for storing the setting histories generated by the controller 11 that has read the setting history processing program 232. The setting histories stored in the setting history storage area 237 are read as necessary during the display processing and the execution of jobs based on the setting histories. Once a deletion request of the setting history by operating the delete all button is accepted, the controller 11 controls the deletion of the setting history stored in the setting history storage area 237. Here, the setting history storage area 237 may store the setting histories pertaining to the jobs executed by the authenticated user and the setting histories pertaining to the jobs executed by all users including the authenticated user in separate storage areas. By separately storing and controlling the setting history pertaining to the authenticated user and the setting history pertaining to all users, it is possible to directly access the setting history pertaining to user authentication when the setting history deletion instruction is entered in a state in which the user authentication function is effective.

The setting history according to the present disclosure is described. FIG. 3A illustrates an example of a data structure of the setting history stored in the setting history storage area 237. FIG. 3B illustrates an example data structure of the setting value file linked to the setting histories illustrated in FIG. 3A.

The setting histories illustrated in FIG. 3A each include a history ID, execution date and time, a job type, displayed setting values, and a setting value file name.

The history ID is identification information to uniquely identify the setting history. The history ID is assigned to each setting history generated. As illustrated in FIG. 3A, the history ID may be a serial number, or may include a predetermined string of characters, symbols, or the like. The execution date and time indicates the date and time when the job is executed. The job type indicates the type of the executed job (for example, copy job, fax job, or image transmission job (email, Scan-to-SMB, or the like). The displayed setting values indicate some of the setting values (contents) that are displayed on the display screen displaying a list of setting histories. The setting value file name indicates the file name of the setting value file linked to the relevant setting history.

For example, the setting history of the history ID "0099" represents the setting history pertaining to the job type "copy" executed at 20:20 on Feb. 22, 2020. Furthermore, the job is the copy job executed in accordance with the setting values included in the setting value file "0099.config" in which the setting values (items) including "color mode: full color, two-sided (copy): one-sided→one-sided, copy density: auto, . . . " are set as the displayed setting values to be displayed on the display screen. The displayed setting values that are set according to each history ID are merely examples, and the setting values displayed on the display screen are not limited to the items illustrated in FIGS. 3A and 3B.

FIG. 3B is a view illustrating an example of a data structure of the setting value file "0098.config" linked to the job ID "0098". For example, the setting value file illustrated in FIG. 3B can be provided as a text file or binary data accommodating the setting values pertaining to the execution of the job, such as "Destination: AAA@sampleA.co.jp, BBB@sampleB.co.jp, Format: highly compressed PDF, Resolution: 600×600 dpi, Page Consolidation: off, Card Scan: off, Skip Blank Page: on, Mixed Originals: on, Number of Originals: off, Test Copy: off, Multicrop scan/Picture crop: off, . . . ). In executing the job based on the setting history, the controller 11 executes the job pertaining to the related setting history using the setting values stored in the setting value file. Upon completion of the processing pertaining to the job, the controller 11 stores the setting values used for executing the job in the setting value file.

The job history storage area 238 is a storage area storing job execution records as the job histories. The job history according to the present disclosure is described. FIG. 4 illustrates an example of the data structure of the job history stored in the job history storage area 238.

The job history illustrated in FIG. 4 includes the job ID, the execution date and time, the job type, the user name, and the status.

The job ID is an identifier to uniquely identify a job that has been executed. The job ID is generated each time the job is executed. The job ID may be a serial number, as illustrated in FIG. 4, or may include a predetermined string of characters, symbols, or the like.

The history ID, the execution date and time, and the job type are the same items and have the same contents as those included in the setting history described by referring to FIG. 3. The user name indicates the name of the user who has executed the job. The status indicates the processing status of the job.

For example, the job history pertaining to the job ID "0097" indicates the job history of the job type "fax" executed at 18:18 on Feb. 22, 2020. For this job, the execution instruction has been input by the user name "aaaaa" and the status of the job is "completed".

Unlike the setting history, the job history is information recording the execution history of the job, and the timing of its generation is not limited. For example, the job history can be generated at any time, such as before or after the execution of the job or before or after the generation of the setting history.

1.2 Process Flow

1.2.1 Process Flow for Generation of Setting History

Next, a process flow of the first embodiment is described. FIG. 5 is a flowchart schematically illustrating a process flow according to the generation of the setting history by the multifunctional peripheral 10. The controller 11 generates the setting history by reading the job execution program 231, the setting history processing program 232, and the like.

The controller 11 accepts the job execution instruction entered via the setting screen pertaining to copying, faxing, image transmission, and the like (step S10). In this case, the user can input the job execution instruction after performing necessary settings using the setting history displayed via the home screen or the setting screen corresponding to each job type.

Upon acceptance of the input of the job execution instruction, the controller 11 executes the job (step S20). The term "job execution" as used herein means a series of processing that are executed under the control of a job mode, such as copying, faxing, image transmission, or the like, from reading the setting history or inputting the setting values until the job that has started upon acceptance of the input of the job execution instruction completes its operation.

Upon execution of the job, the controller 11 acquires the setting values pertaining to the executed job and generates the setting value file storing the setting values. The controller 11 then stores the generated setting value file in the setting value file storage area 236. The controller 11 also generates the setting history by linking the setting value file to the identification information (history ID) to identify to which job it is related. The controller 11 then stores the generated setting history in the setting history storage area 237 (step S30). In generation and storage of the setting history, the input of the job execution instruction may be used as a trigger to start processing, so that the execution timing of generation and storage of the setting history is not limited to that described herein.

Upon generation of the job history as the job execution history, the controller 11 stores the job history in the job history storage area 238 (step S40) and ends the process. In the description of FIG. 5, the job history is generated after the generation and storage of the setting history. Alternatively, the job history can of course be generated after the input of the job execution instruction in step S10, simultaneously with the job execution in step S20, or before the generation and storage of the setting history in step S30.

1.2.2 Overall Process Flow Related to Deletion Control of Setting History

Figure 6:
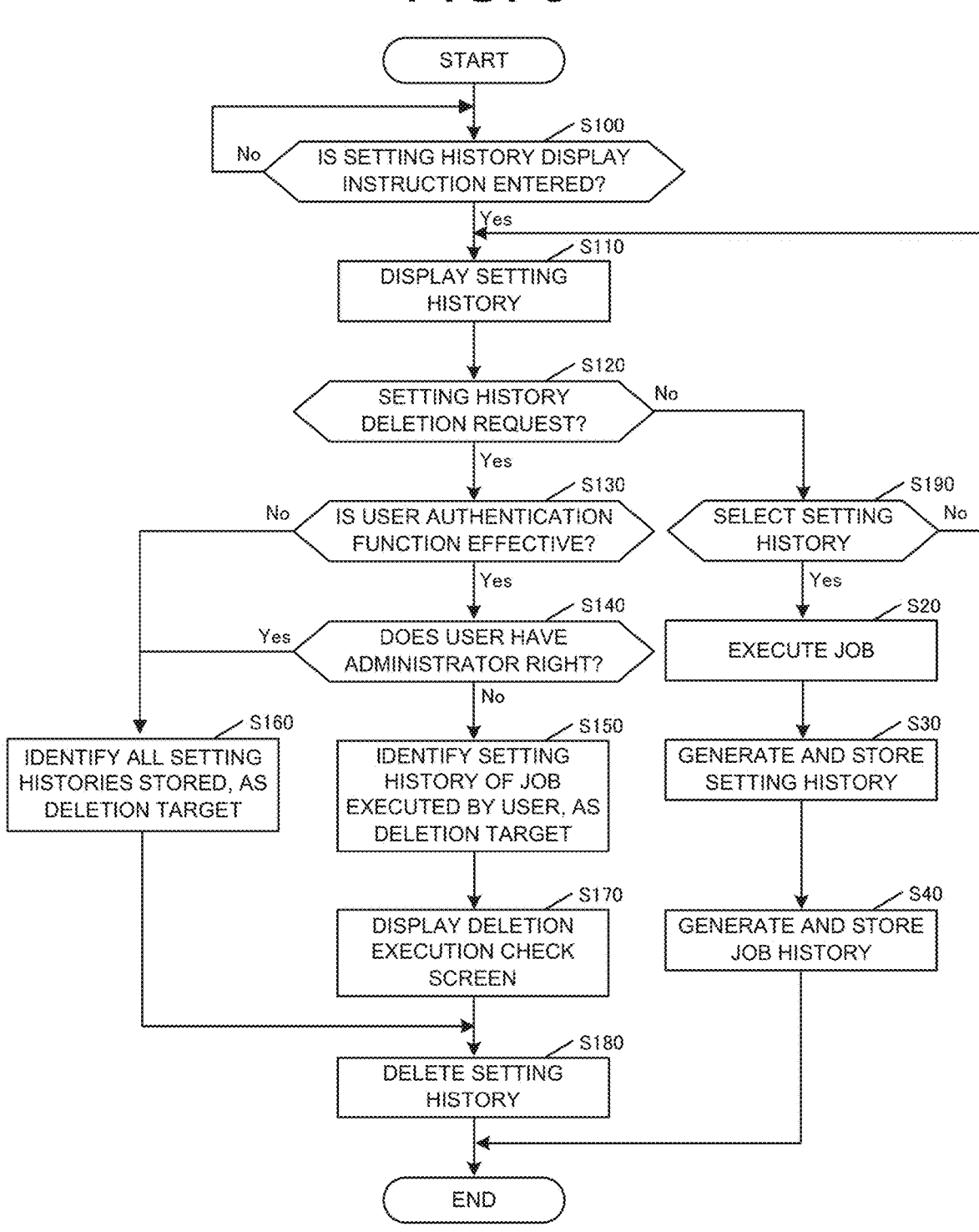
FIG. 6 is a flowchart explaining a process flow of according to the first embodiment.

Next, an overall process flow related to the deletion control of the setting history is described by referring to the flowchart in FIG. 6. The controller 11 reads the setting history processing program 232, the user authentication program 233, the history to be deleted identifying program 234, the display processing program 235, and the like to execute the process described in FIG. 6.

First, the controller 11 determines whether it accepts the input of the setting history display instruction by the user (step S100). For example, the user can input the instruction to display the setting history via the home screen which will be describe later, or the execution screen (not illustrated) for each job such as copying, faxing, image transmission, or the like.

Once the instruction to display the setting history is input by the user, the controller 11 displays the setting history display screen which will be describe later on the display 13 (step S100; Yes→step S110). On the other hand, if the user does not input the instruction to display the setting history, the controller 11 continues to display the current screen (for example, home screen or the like) (step S100: No).

Subsequently, the controller 11 determines whether the delete all button provided on the setting history display screen is operated to make a deletion request of the setting history (step S120). If it is determined that the deletion request of the setting history is made, the controller 11 determines whether the user authentication function is effective (step S120; Yes→step S130).

If it is determined that the user authentication function is effective (enabled), the controller 11 determines whether the user who has requested deletion of the setting history has an administrator right (step S130; Yes→step S140). If it is determined that the user who has requested deletion of the setting history does not have the administrator right, the controller 11 identifies the setting histories of the job executed by this user as the deletion target (step S140; No→step S150). As used herein, the administrator right according to the present disclosure means the authority given to the administrator of the apparatus to manage and maintain the apparatus, such as the apparatus settings (for example, operating conditions, environmental conditions, authenticated user registration, or the like) and maintenance of the multifunctional peripheral 10 via the system settings screen.

Subsequently, the controller 11 displays a deletion execution check screen on the display 13, asking whether the deletion of the setting histories is allowed (step S170). The controller 11 then performs deletion control of the setting history (step S180) and ends the process. In addition to displaying the deletion execution check screen, it is also possible, for example, to remove the setting history which is not to be deleted from the deletion target, or to incorporate the setting history which is not to be deleted into the job program. As used herein, the job program according to the present disclosure refers to a technique for permanently and manually storing the settings related to jobs, and indicates a batch setting in which the settings related to job processing are registered in a batch. In the use case in which a regular job is repeatedly executed, the user can revoke and execute the job program to set the setting values for the job at a time, thereby reducing the number of setting steps to execute the job.

On the other hand, if it is determined that the user authentication function is ineffective (disabled) (step S130; No), and if it is determined that the user who has requested deletion is the user having the administrator right (step S140; Yes), then the controller 11 identifies the setting histories of all jobs having been executed up until the deletion request is made as the deletion target (step S160). The controller 11 then performs deletion control of the setting history (step S180) and ends the process.

If it is determined that the deletion request of the setting history has not been made, the controller 11 determines whether the setting history has been selected for the execution of the job (step S120; No→step S190).

If it is determined that the setting history for the execution of the job has been selected, the controller 11 executes the job in accordance with the selected setting history (step S190; Yes→step S20).

After executing the job in accordance with the selected setting history, the controller 11 generates the setting history pertaining to the execution of the job and stores it in the setting history storage area 237 (step S30). The controller 11 then generates the job history, stores it in the job history storage area 238, and ends the process. In generation and storage of the setting history, the input of the job execution instruction may be used as a trigger to start processing, so that the execution timing of generation and storage of the setting history is not limited to that described herein.

If it is determined that no setting history is selected for the execution of the job, the controller 11 returns the process to step S110 (step S190; No→step S110).

1.3 Operation Example

Next, an operation example according to the first embodiment is described. FIG. 7 illustrates an example of the user login screen (authentication screen) displayed by the controller 11 with the user authentication function enabled by reading the user authentication program 233.

A user login screen W10 includes a login user name input box Bx10, a login password input box Bx12, an authentication destination selection button B10, an OK button B12, and a cancel button B14.

The login user name input box Bx10 is an input box that accepts the input of the login user name of the user requesting login to the multifunctional peripheral 10.

The login password input box Bx12 is an input box that accepts the input of the login password associated with the login user name of the user requesting login to the multifunctional peripheral 10.

The authentication destination selection button B10 is a button for accepting a destination where the user is to be authenticated. In the illustration of FIG. 7, the user authentication is performed locally by the device (multifunctional peripheral 10). When the user management is performed by another device such as a management server via the network (NW), the name of the device and its location information on the network (for example, an IP address) can be selected.

The OK button B12 is a button that accepts a login authentication operation by the user. The cancel button B14 is a button that accepts cancellation of the login authentication operation by the user.

FIG. 8 illustrates an example of the home screen W20 displayed by the controller 11 when the login authentication by the user is successful.

The home screen W20 includes a display area R10 for job functions and the like, a login user name display area R12, and a display area switching button B16 for job functions and the like.

The display area R10 for job functions and the like is an area for displaying a collection of selection buttons for job functions and the like to accept a selection of each job function, a display instruction of the setting history information, or the like. The selection buttons for job functions and the like are selection buttons having the screen structure illustrating the job functions, information, or the like in a form of graphics, letters, numbers, or symbols.

The display area R10 for job functions and the like illustrated in FIG. 8 illustrates examples of the selection buttons for job functions and the like that accept a selection of the job function, such as a simple copy button, a simple fax button, a simple scan button, an email button, a history information button B18, an external address book button, a scan and save button, a fax button, and the like, or accept input of a display instruction of the setting history.

The login user name display area R12 is a display area that displays the login user name of the user (authenticated user). A logout button is displayed in the login user name display area R12, along with the login user name, to allow the user to log out of the multifunctional peripheral 10. The login user name display area R12 is not displayed when the user authentication function is ineffective, or when a non-authenticated user or the like operates the home screen W20.

The display area switching button B16 for job functions and the like accepts input of the instruction by the user in switching display contents of the display area R10 for job functions and the like. Upon acceptance of the input of the instruction by the user using the display area switching button B16 for the job functions and the like, the controller 11 switches the selection button for the job functions and the like to switch the display contents of the display area R10 for the job functions and the like.

Figure 9:
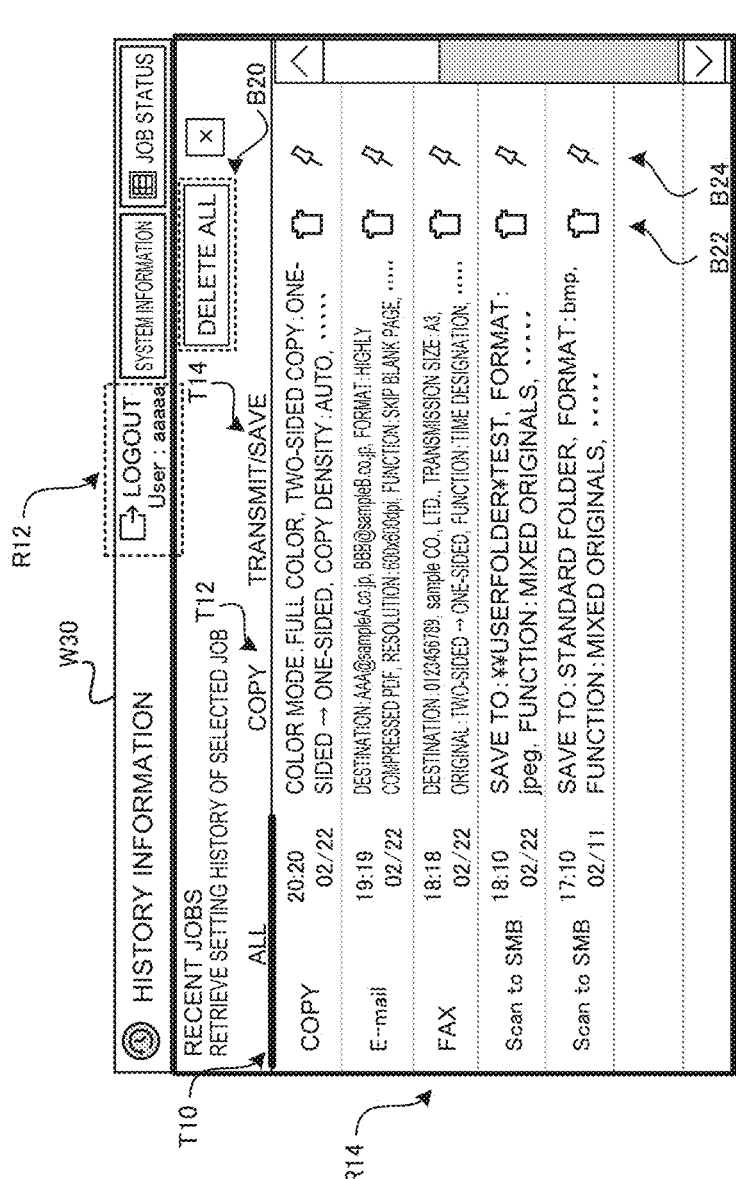
FIG. 9 is a view illustrating an operation example according to the first embodiment.

FIG. 9 illustrates an example structure of a setting history display screen W30 displayed by the controller 11 in response to tapping the history information button B18 on the home screen W20.

The setting history display screen W30 includes a setting history display area R14. The setting history display area R14 is a display area for displaying setting histories corresponding to the jobs executed by the user. The setting history display area R14 includes the login user name display area R12, an all tab T10, a copy tab T12, and a transmit/save tab T14, a delete all button B20, individual delete buttons B22, and pinning buttons B24.

The login user name display area R12 is identical to that displayed on the home screen W20 in FIG. 8. The login user name display area R12 displays the login user name of the user (authenticated user).

The all tab T10, the copy tab T12, and the transmit/save tab T14 are tabs used for displaying the setting histories by filtering the setting histories to be displayed according to the job type. FIG. 9 is a display example of the setting histories (history ID "0099" to "0096", "0091") pertaining to all jobs executed by the user "aaaaa" (see FIGS. 3 and 4). A bold underline under the selected tab is displayed to indicate that the tab is selected.

The delete all button B20 is a button that accepts the request from the user to delete the setting histories. Upon detection of the input of the delete all button B20 by the user, the controller 11 determines that the request to delete all setting histories has been made. Upon detection of the input of the delete all button B20 by the user, the controller 11 determines whether the user who has requested the deletion has the administrator right. Here, if it is determined that the user who has requested the deletion does not have the administrator right, the controller 11 identifies only the setting histories of the jobs executed by this user as the deletion target. If it is determined that the user who has requested deletion is the user having the administrator right, the controller 11 identifies all setting histories of jobs executed before the deletion request is made as the deletion target. The controller 11 then controls the deletion of the setting history.

The individual delete buttons B22 are buttons that accept individual delete instructions of the displayed setting histories. Upon acceptance of the input of the individual delete buttons B22, the controller 11 deletes the relevant setting histories from the setting history storage area 237.

The pinning buttons B24 are buttons that accept input of the instruction to fix display of the setting histories in the setting history display area R14. In the present disclosure, the display control to fix display of the setting histories within the display area is referred to as pinning. Upon acceptance of the input of the instruction by tapping the pinning buttons B24, the controller 11 fixes the relevant setting histories in the setting history display area R14. In the present disclosure, the pinning setting for the setting history is treated as a form of a specific setting imposed on the setting history.

In the setting history display area R14, the job type, the job execution date and time, and the display setting values are displayed as the setting history of each job. For example, the setting history displayed in the top row of the display area is a display example of the setting history related to a copy job executed by the user "aaaaa" at 20:20 on Feb. 22, 2020.

Figure 10:
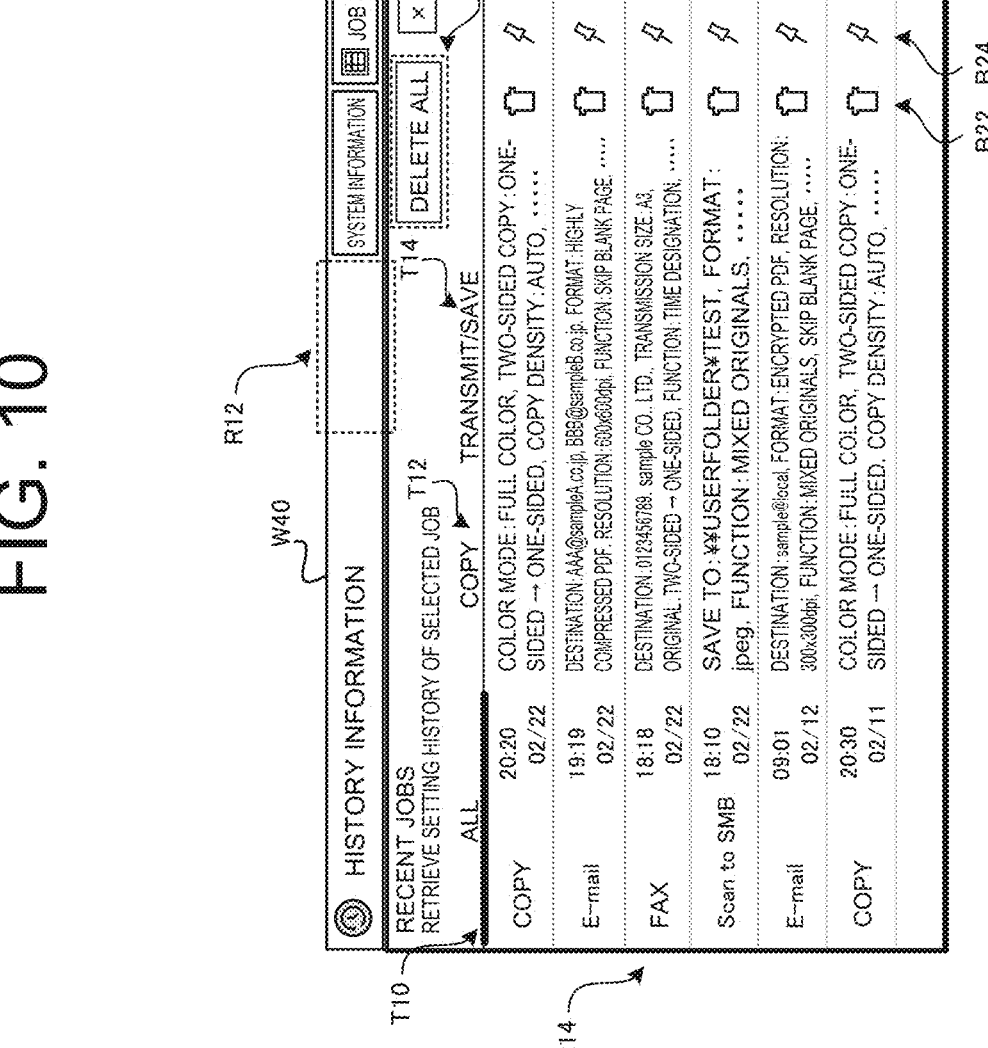
FIG. 10 is a view illustrating an operation example according to the first embodiment.

FIG. 10 illustrates an example of a setting history display screen W40 displayed by the controller 11 when the user authentication function is disabled or a non-authenticated user (including a user to be authentication is not authenticated yet) has tapped the history information button B18 provided on the home screen (not illustrated).

The setting history display screen W40 can have substantially the same structure as the setting history display screen W30 illustrated in FIG. 9, but differs from the setting history display screen W30 in that the setting history display screen W40 does not display the login user name display area R12.

The setting history display area R14 of the setting history display screen W40 displays the setting histories (history ID "0099" to "0090") related to all jobs that have been executed. Although the example of FIG. 10 illustrates only the setting histories of history ID "0099" to "0094", the setting histories on and after the history ID "0093" can be displayed by operating the scroll bar provided on the right side of the screen.

The delete all button B20 on the setting history display screen W40 is a button that accepts the deletion request of the setting histories from the user. Upon detection of the input of the delete all button B20 by the user, the controller 11 determines that the request to delete all setting histories has been made. Upon detection of the input of the delete all button B20 by the user, the controller 11 identifies the setting histories of all jobs that have been executed before the deletion request is made as the deletion target. The controller 11 then controls the deletion of the setting histories.

Figure 11:
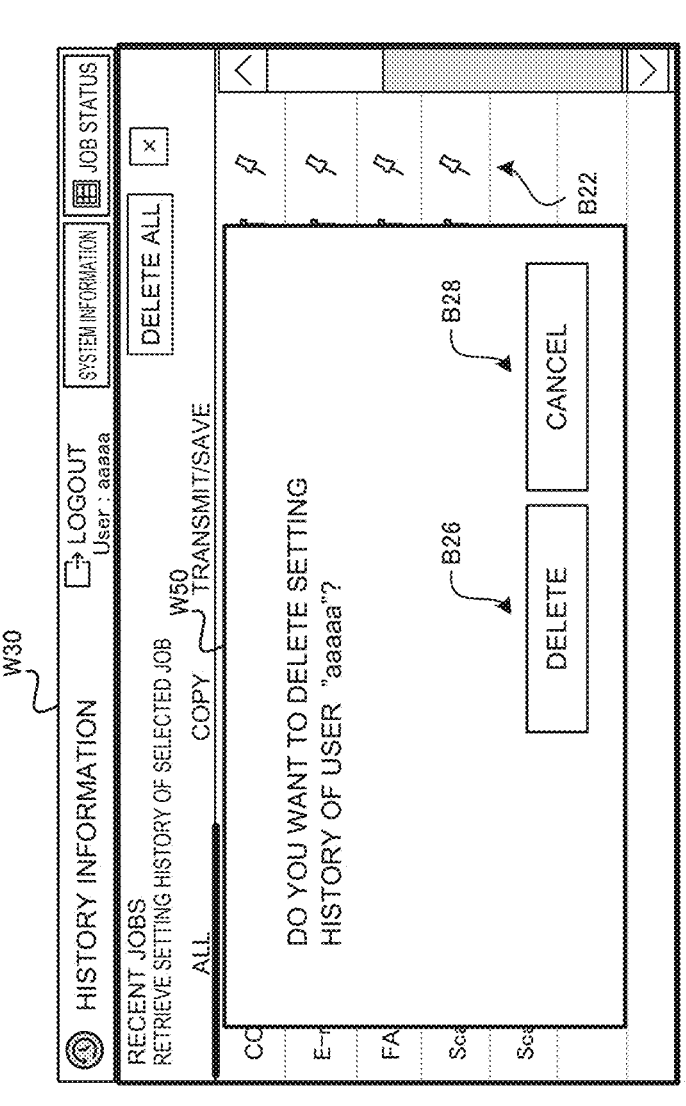
FIG. 11 is a view illustrating an operation example according to the first embodiment.

FIG. 11 illustrates an example of a deletion execution check screen W50 displayed by the controller 11 upon acceptance of the deletion request of the setting histories in response to tapping the delete all button B20 on the setting history display screen W30. The deletion execution check screen W50 asks the user whether to allow or not allow the deletion of the setting histories by providing a message "Do you want to delete the setting histories of the user "aaaaa"? If the user wishes to allow the deletion of the setting histories upon acceptance of the message, the user taps the delete button B26. Upon tapping the delete button B26, the controller 11 deletes the setting histories. On the other hand, if the user does not allow the deletion of the setting histories, the user taps the cancel button B28. Upon tapping the cancel button B28, the controller 11 does not perform deletion control of the setting histories.

As described above, the first embodiment allows the deletion control of the setting histories by reflecting the operation status of the multifunctional peripheral, such as whether the authentication function is effective, thus achieving more flexible deletion control of the setting histories.

2. Second Embodiment

A second embodiment is to display a deletion execution check screen or the like or sets priority of the deletion target, when the deletion request is made by the user for the setting histories to which a specific setting is applied, thus preventing the deletion of these setting histories immediately after the deletion request is made.

As used herein, the specific setting refers to a concept including settings, conditions, setting values, or the like applied to the setting histories that would adversely reduce user convenience if such setting histories were uniformly targeted for deletion when the deletion request of the setting histories is made. The specific setting includes, for example, the pinning setting, the setting histories with a large number of references, the setting histories with a high degree of user attention due to a newer last reference date, the setting histories with many setting value changes, or the setting histories including special processing (for example, stapling) as a setting value. In the second embodiment, the pinning setting is described as an example of the specific setting.

2.1 Functional Structure

Figure 12:
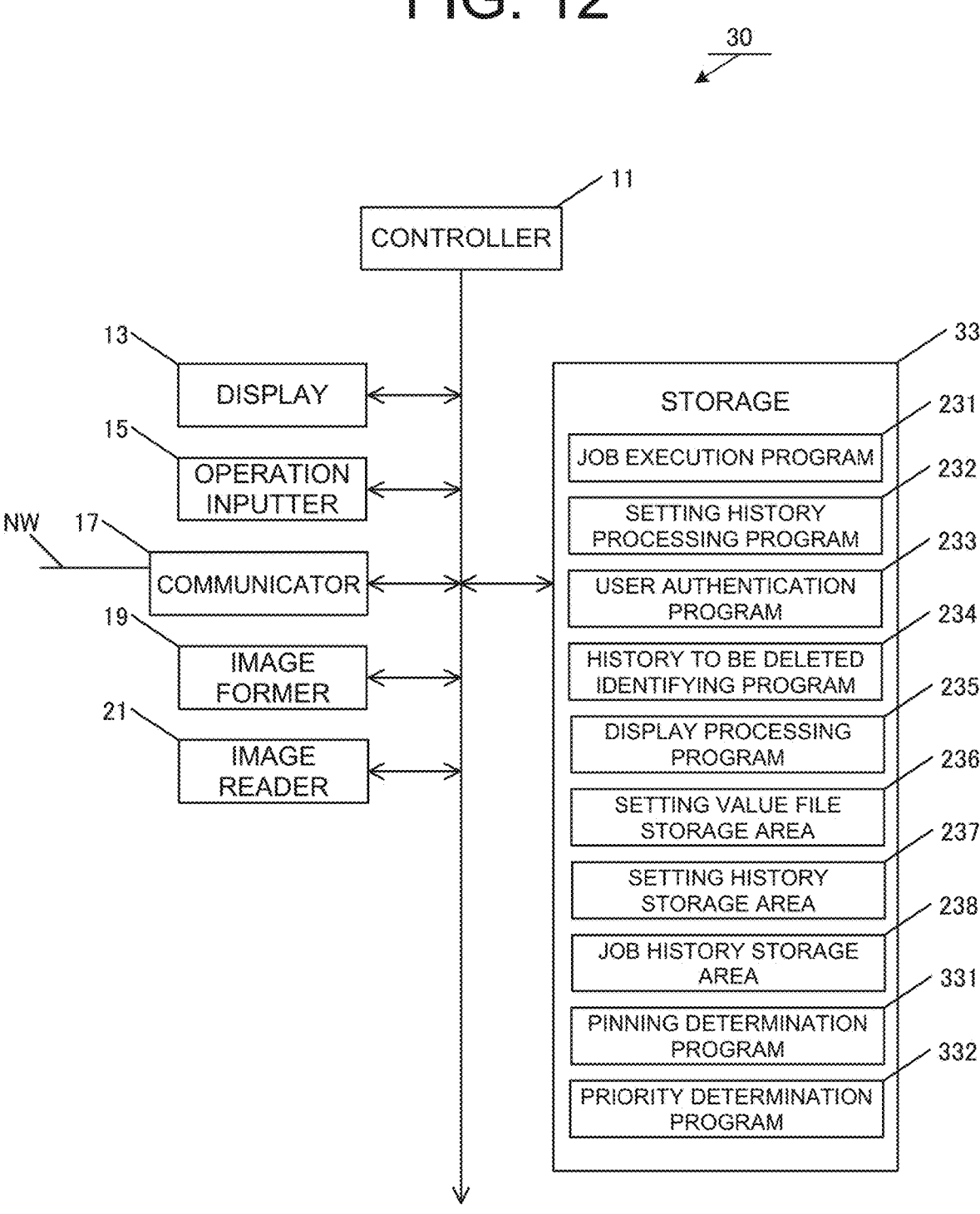
FIG. 12 illustrates a functional structure of a multifunctional peripheral according to a second embodiment.

FIG. 12 illustrates a functional structure of a multifunctional peripheral 30 according to the second embodiment. The functional structure of the multifunctional peripheral 30 according to the second embodiment can be substantially identical to the functional structure of the multifunctional peripheral 10 according to the first embodiment. Therefore, the same components are marked with the same reference signs and the description thereof will be omitted.

The multifunctional peripheral 30 includes the controller 11, the display 13, the operation inputter 15, the communicator 17, the image former 19, the image reader 21, and the storage 33.

In the second embodiment, the storage 33 includes the job execution program 231, the setting history processing program 232, the user authentication program 233, the history to be deleted identifying program 234, the display processing program 235, a pinning determination program 331, and a priority determination program 332, and reserves the setting value file storage area 236, the setting history storage area 237, and the job history storage area 238.

The pinning determination program 331 is a program read by the controller 11 when determining the setting histories to which the pinning setting is applied as the specific setting. For example, the controller 11 that has read the pinning determination program 331 can refer to a setting history-to-pinning management table which will be described later to identify the setting histories to which the pinning setting is applied. The pinning determination program 331 is a form of the determination program that determines whether the specific setting is applied to the setting history. As mentioned above, the specific setting is not limited to the pinning setting. In addition to the pinning setting, the setting histories such as the setting histories with a large number of references, the setting histories with a high degree of user attention due to a newer last reference date, the setting histories with many setting value changes, or the setting histories including special processing (for example, stapling) as a setting value may be treated as the setting histories to which the specific setting is applied. For example, when determining the setting histories with a high number of references as the specific setting, a determination program corresponding to a specific setting value, such as a "reference count determination program", should be applied.

The priority determination program 332 is a program read by the controller 11 when determining the priority of the setting histories to be removed from the deletion target among the setting histories to which the pinning setting is applied. The controller 11 that has read the priority determination program 333 determines the priority according to the settings by the user or the predetermined setting conditions, and removes the setting histories from the deletion target according to the determined priority.

2.2 Process Flow

Next, a process flow of the second embodiment is described with reference to the flowchart illustrated in FIG. 13. The controller 11 executes the process illustrated in FIG. 13 by reading the setting history processing program 232, the user authentication program 233, the history to be deleted identifying program 234, the display processing program 235, the pinning determination program 331, the priority determination program 332, and the like.

The process from step S100 to step S120 described with FIG. 6 are common steps, and the description thereof will be omitted here. The same step numbers are given to the processing steps identical to the steps described in FIG. 6, and the description thereof may be omitted.

The controller 11 determines whether the user authentication function is effective (step S130). If it is determined that the user authentication function is effective (enabled), the controller 11 determines whether the user who has requested deletion of the setting history has the administrator right (step S130; Yes→step S140). If it is determined that the user who has requested deletion of the setting history does not have the administrator right, the controller 11 determines whether there are pinned setting histories of the user (step S140; No→step S200).

If it is determined that there are pinned setting histories of the user, the controller 11 determines the priority of the pinned setting histories of the user (step S200; Yes→step S210).

Subsequently, if there is the deletion priority of the setting histories other than the pinned setting histories is set by the user, the controller 11 determines the deletion priority (step S220).

The controller 11 displays the deletion execution check screen on the display 13, asking whether the deletion of the setting histories is allowed (step S170). The controller 11 then controls the deletion of the setting history (step S180) and ends the process. In this case, the controller 11 first deletes the setting histories other than the setting histories to which the pinning setting has been applied, and then delete the setting histories determined to be deleted among the setting histories to which the pinning setting has been applied according to the deletion priority (for example, the setting histories with a small number of references, the setting histories with an old reference history, or the like among the setting histories to which the pinning setting has been applied).

On the other hand, if it is determined that there are no pinned setting histories of the user, the controller 11 identifies the setting histories of the jobs executed by the user as the deletion target (step S200; No→step S150).

Subsequently, the controller 11 displays the deletion execution check screen on the display 13 (step S170). The controller 11 then performs deletion control of the setting history (step S180) and ends the process.

If it is determined that the user authentication function is ineffective (disabled) (step S130: No), and if the user who has requested deletion is the user who has the administrator right (step S140; Yes), the controller 11 determines whether there are pinned setting histories (step S230).

If it is determined that there are pinned setting histories, the controller 11 determines the priority of the pinned setting history (step S230; Yes→step S240).

Subsequently, if there is the deletion priority of the setting histories other than the pinned setting histories is set by the user, the controller 11 determines the deletion priority (step S260).

The controller 11 displays the deletion execution check screen on the display 13, asking whether the deletion of the setting history is allowed (step S170). The controller 11 then controls the deletion of the setting history (step S180) and ends the process. In this case, the controller 11 first deletes the setting histories other than the setting histories to which the pinning setting has been applied, and then delete the setting histories determined to be deleted among the setting histories to which the pinning setting has been applied according to the deletion priority (for example, the setting histories with a small number of references, the setting histories with an old reference history, or the like among the setting histories to which the pinning setting has been applied).

On the other hand, if it is determined that there are no pinned setting histories, all setting histories of the jobs that have been executed before the deletion request is made are identified as the deletion target (step S230; No→step S160). The controller 11 then performs deletion control of the setting history (step S180) and ends the process.

2.3 Operation Example

Figure 14:
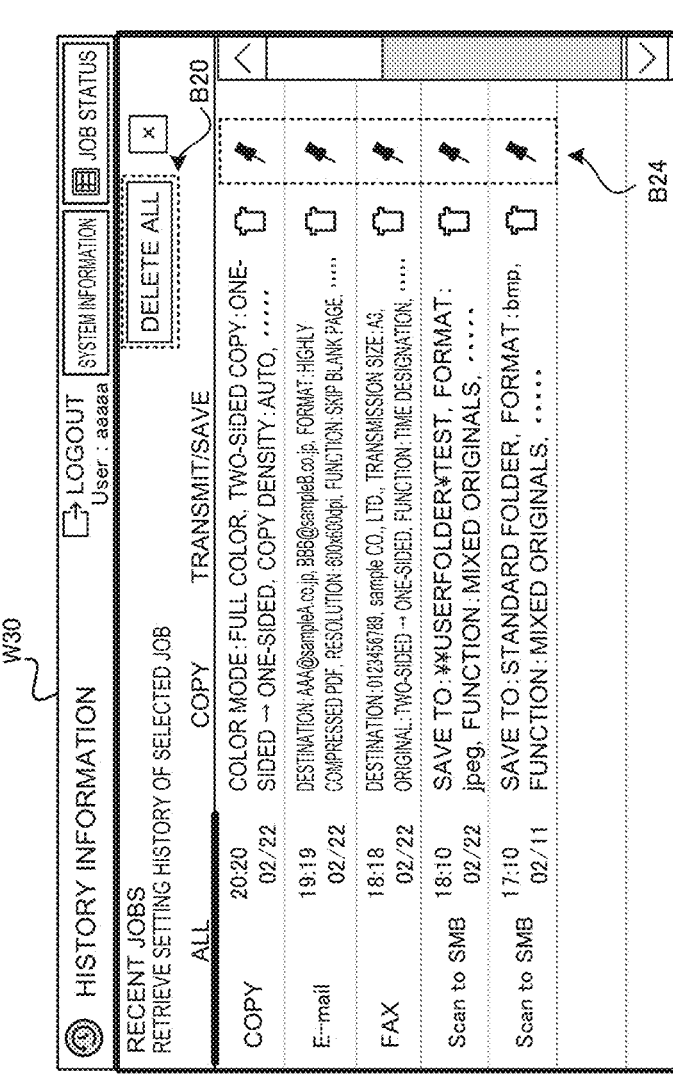
FIG. 14 is a view illustrating an operation example according to the second embodiment.

Next, an operation example according to the second embodiment is described. FIG. 14 is a display example of the setting history display screen W30 in which the pinning setting is applied to the setting histories and displayed by the controller 11 in response to tapping of the history information button B18 on the home screen W20 illustrated in FIG. 8.

The setting history display screen W30 illustrated in FIG. 14 is a display example of the setting histories pertaining to the jobs executed by the user (authenticated user) with the login user name "aaaaa". FIG. 14 illustrates an example of applying the pinning setting to all setting histories (history ID "0099" to "0096", "0091") executed by the user name "aaaaa". When the pinning setting is applied, the display of the pinning buttons B24 is changed dark.

Figure 15:
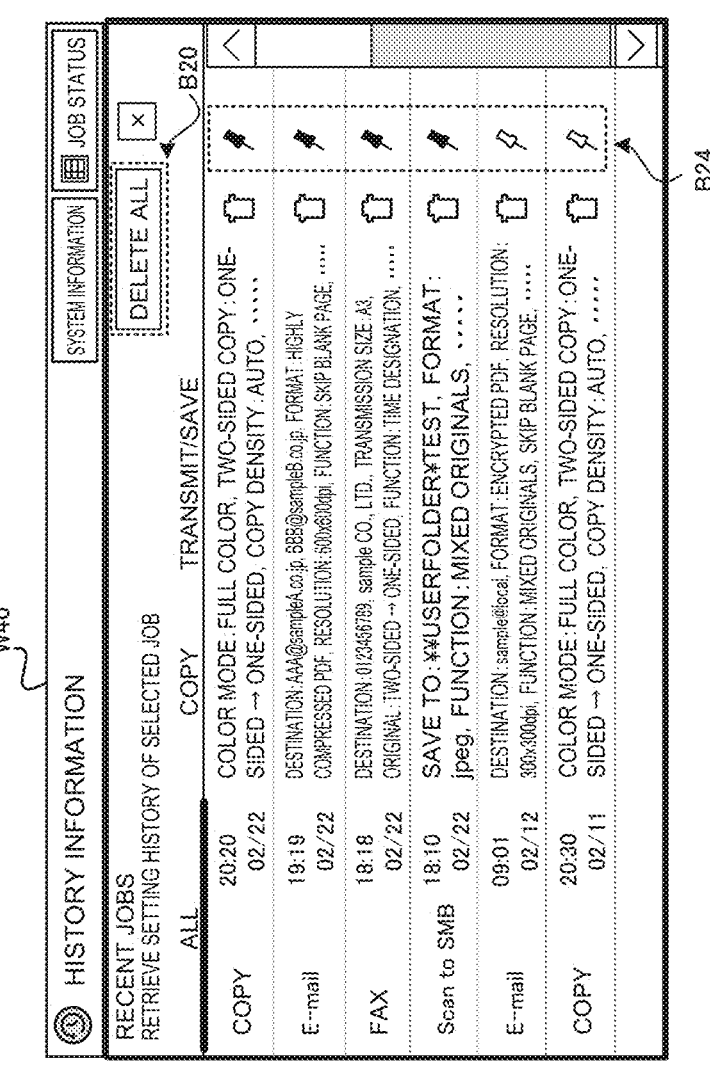
FIG. 15 is a view illustrating an operation example according to the second embodiment.

On the other hand, FIG. 15 is an example of the setting history display screen W40 displayed by the controller 11 when the user authentication function is disabled or a non-authenticated user (including a user to be authentication is not authenticated yet) has tapped the history information display button provided on the home screen (not illustrated).

The setting history display screen W40 illustrated in FIG. 15 is a display example of displaying the setting histories (history ID "0099" to "0090") related to all jobs that have been executed. FIG. 15 is an example in which the pinning setting is applied to the setting histories of the jobs (history ID "0099" to "0096") executed by the login user name "aaaaa", while no pinning setting is applied to the other setting histories. In the setting history display screen, as illustrated in FIGS. 14 and 15, the number of displayed items of the setting histories to which the specific setting, that is, the pinning setting, is applied differs depending on whether the authentication function is effective and whether it is before or after the authentication of the user, except for the case in which all jobs have been executed by the same user.

FIG. 16A is a table explaining an example of the data structure of the setting history-to-pinning management table. FIG. 16B is a view explaining an example of the data structure of a setting value file to which the pinning setting is applied.

The setting history-to-pinning management table is a table referenced by the controller 11 that has read the pinning determination program 331. FIG. 16A illustrates an example to applying the pinning setting to the setting histories (history ID "0099" to "0096", "0091") of the login user name "aaaaa". The setting history-to-pinning management table includes, as management items, the history ID, the setting value file, the pinning flag, and the pinning priority.

The history ID is the identifying information to uniquely identify the setting history. The setting value file is the file name of the setting value file linked to the setting history. The pinning flag is a flag indicating whether the pinning setting is applied to the setting history. The pinning priority indicates the priority of the setting histories to be removed from the deletion target, and is a management item referenced by the controller 11 that has read the priority determination program 332. The pinning priority will be explained with reference to the next drawing.

FIG. 16B is identical to the setting value file "0098.config" illustrated in FIG. 3B. FIG. 16B is an example in which the pinning setting is applied as the specific setting (value). The controller 11 refers to the setting value file illustrated in FIG. 16B to manage and update the setting history-to-pinning management table illustrated in FIG. 16A.

Figure 17:
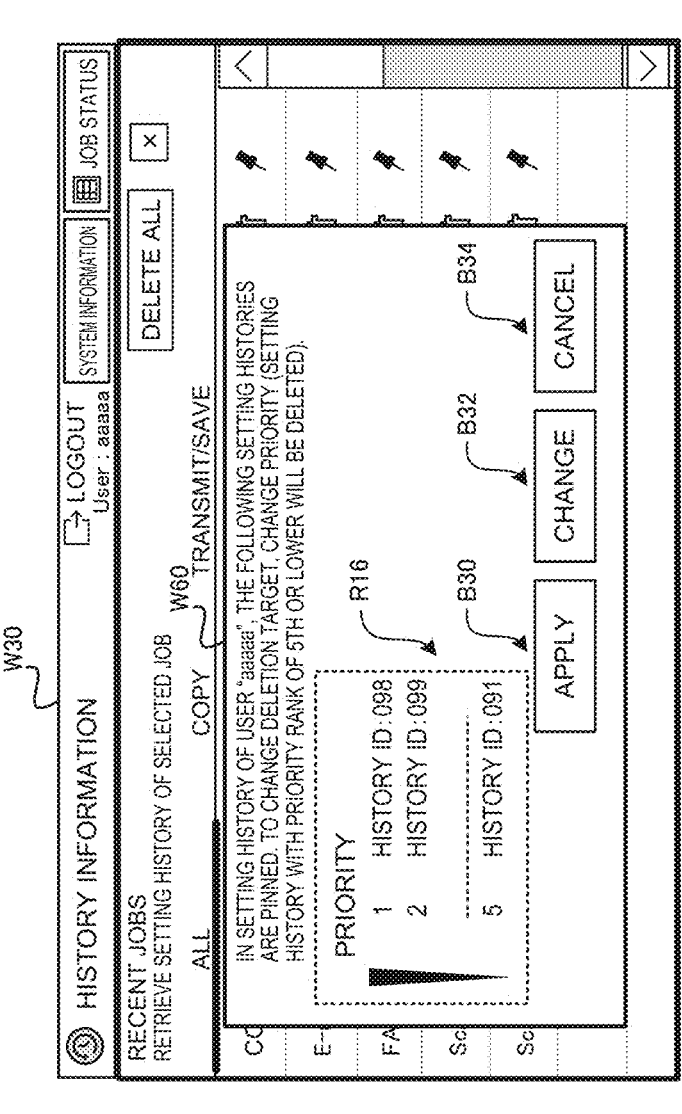
FIG. 17 is a view illustrating an operation example according to the second embodiment.

FIG. 17 is a view illustrating an example structure of a pinning priority check screen W60 for setting the priority of the setting histories to be removed from the deletion target. The pinning priority check screen W60 is a display screen for checking the pinning priority applied to the setting histories. The pinning priority check screen W60 includes a pinning priority display area R16 displaying the currently applied pinning priority, an apply button B30, a change button B32, and a cancel button B34.

The pinning priority display area R16 is a display area displaying the currently applied pinning priority. The pinning priority is displayed in descending order from the setting history with the highest priority. The setting histories with lower priority (not valuable) can be set as the deletion target in response to the deletion request by the user. FIG. 17 illustrates a case in which the setting histories with a priority ranking of the fifth or lower are to be deleted.

The apply button B30 accepts input to apply the pinning priority setting displayed in the pinning priority display area R16. The change button B32 is a button that accepts input to change the pinning priority. The cancel button B34 accepts cancellation of applying the pinning priority setting displayed in the pinning priority display area R16.

Figure 18:
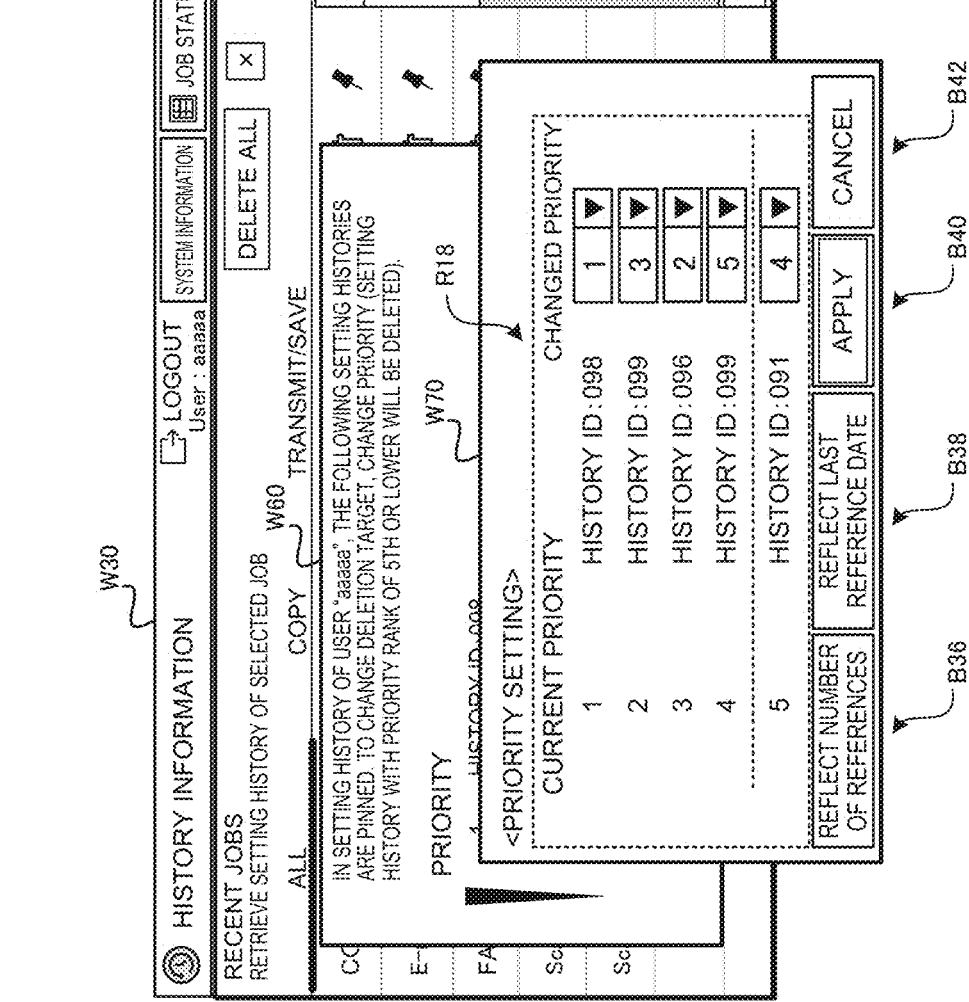
FIG. 18 is a view illustrating an operation example according to the second embodiment.

FIG. 18 is an example of a pinning priority change screen W70 displayed by the controller 11 upon tapping the change button B32 of the pinning priority check screen W60 in FIG. 17. The pinning priority change screen W70 includes a priority change display area R18, a button B36 reflecting the number of references, a button B38 reflecting the last reference date, an apply button B40, and a cancel button B42.

The priority change display area R18 displays the current priority and pull-down buttons to change the current priority. To change the current priority, the user can change the priority of the setting histories to be removed from the deletion target by specifying a changed priority to be displayed by operating the pull-down buttons.

The button B36 reflecting the number of references is a button that is used to sort the current priority in accordance with the number of references of the setting history. The button B38 reflecting the last reference date is a button that is used to sort the current priority in accordance with the last reference date to refer to the setting history. The apply button B40 is a button that accepts input to apply the changed priority. The cancel button B42 is a button that accepts cancellation of applying the changed priority.

Figure 13:
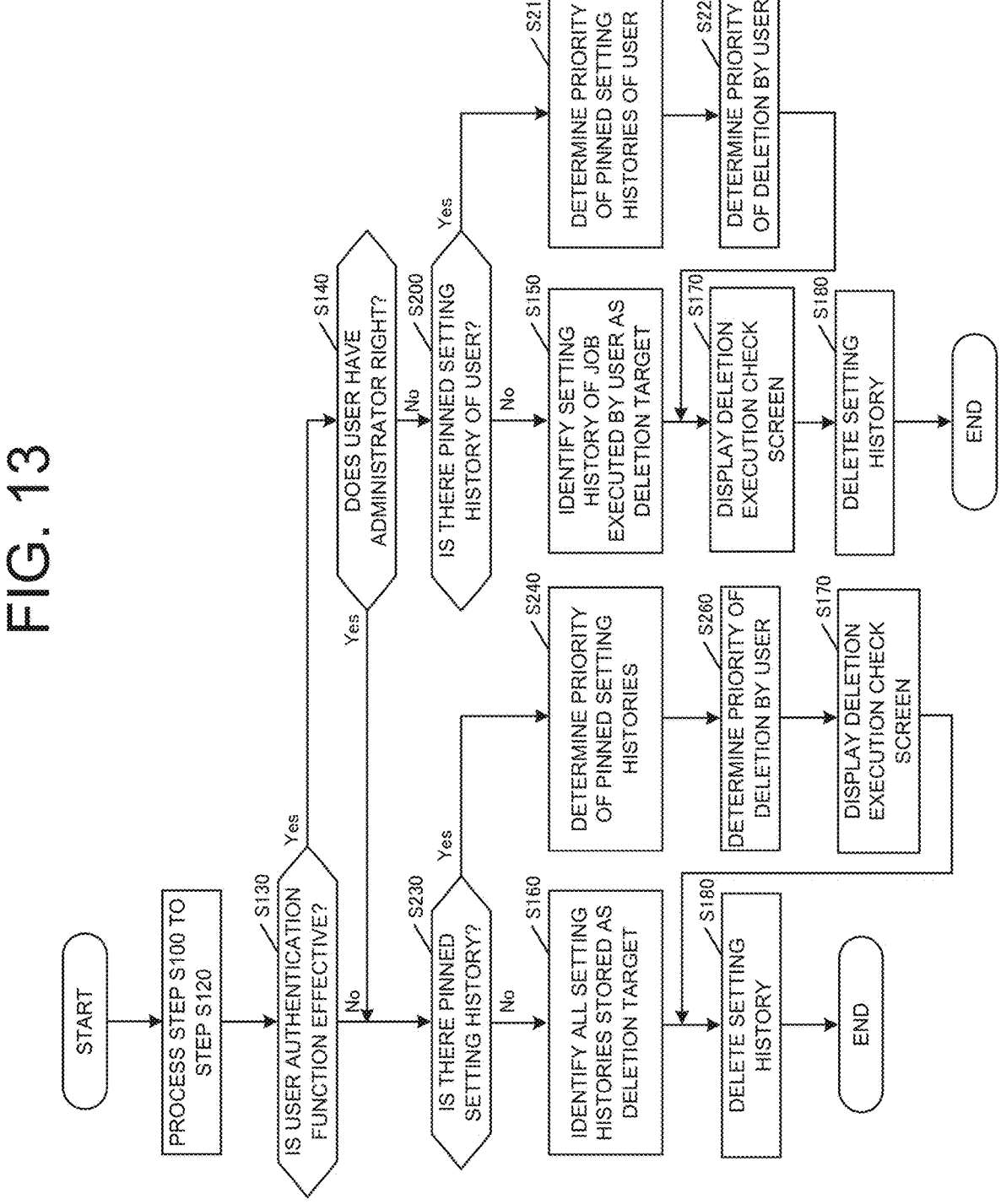
FIG. 13 is a flowchart explaining a process flow according to the second embodiment.

The contents that are changed and set via the pinning priority change screen W70 are reflected in the setting history-to-pinning priority management table illustrated in FIG. 16A, and are referenced in the priority determination process in step S210, step S240, and the like in FIG. 13.

As described above, the second embodiment allows the deletion control of the setting histories by reflecting the state in which the specific setting such as the pinned setting is applied, thus achieving more flexible deletion control of the setting histories.

3. Third Embodiment

A third embodiment is to identify all of the stored setting histories as the deletion target when the overall settings applied to all users are enabled. The overall settings applied to all users may include, for example, the settings related to restrictions of use of the setting histories (prohibition of viewing, use (utilization), storage, or the like, of the setting histories), and the settings related to the application of the setting histories imported from an external device (for example, there is a possibility of importing the setting histories of a different user by mistake). Such overall settings affect all users who use the multifunctional peripheral when the settings are changed.

3.1 Functional Structure

Figure 19:
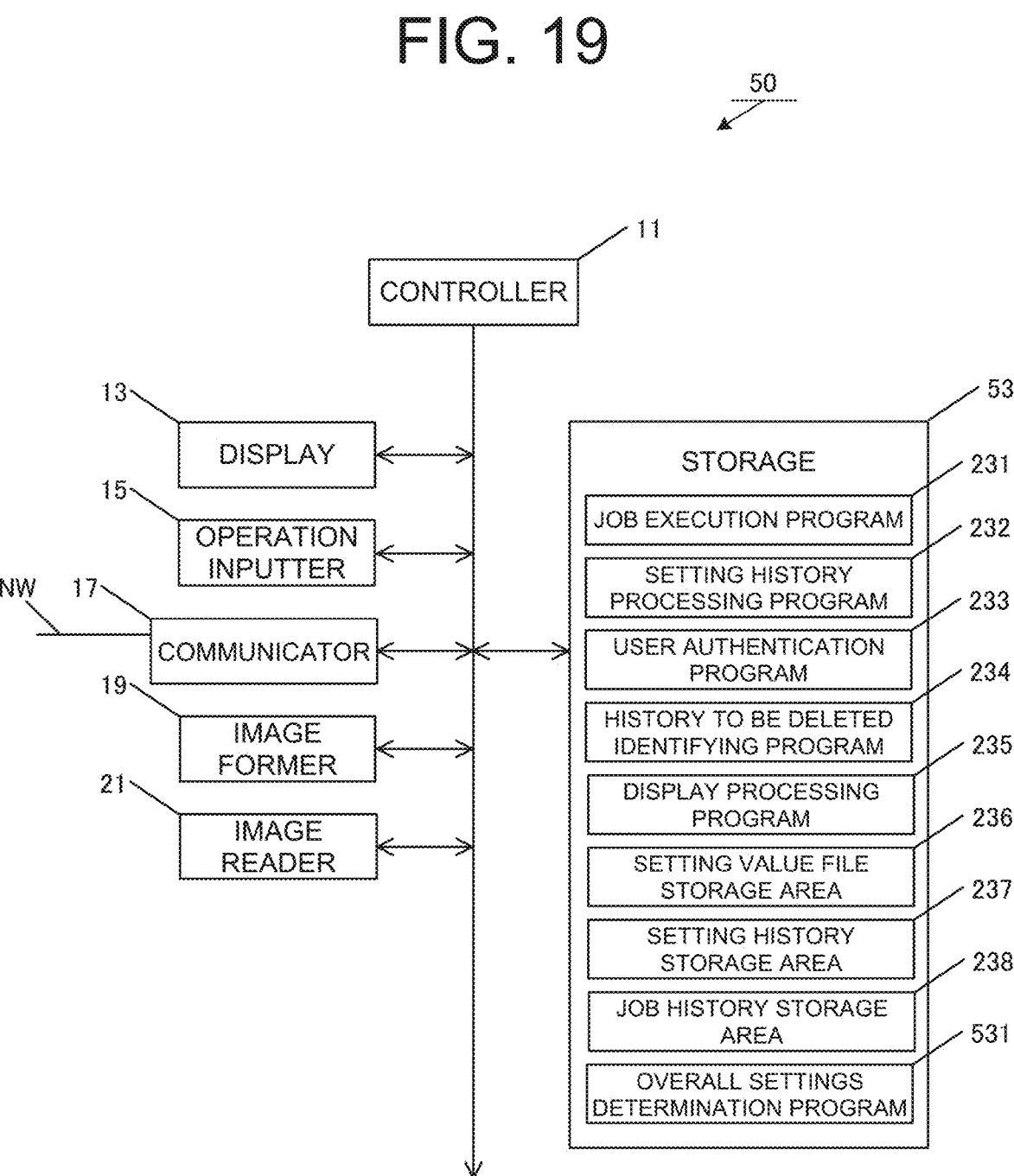
FIG. 19 illustrates a functional structure of a multifunctional peripheral according to a third embodiment.

FIG. 19 is a functional structure of a multifunctional peripheral 50 according to a third embodiment. The functional structure of the multifunctional peripheral 50 according to the third embodiment can be substantially identical to the functional structure of the multifunctional peripheral 10 according to the first embodiment. Therefore, the same components are marked with the same reference signs and the description thereof will be omitted.

The multifunctional peripheral 50 includes the controller 11, the display 13, the operation inputter 15, the communicator 17, the image former 19, the image reader 21, and the storage 53.

In the third embodiment, the storage 53 includes the job execution program 231, the setting history processing program 232, the user authentication program 233, the history to be deleted identifying program 234, the display processing program 235, and an overall settings determination program 531, and reserves the setting value file storage area 236, the setting history storage area 237, and the job history storage area 238.

The overall settings determination program 531 is a program read by the controller 11 when determining whether the overall settings that are applied to the setting histories of all users are enabled. The controller 11 that has read the overall settings determination program 531 determines whether the settings related to restrictions of use of the setting histories, such as prohibitions of viewing, utilization (use), storage, or the like or the settings related to applying the setting histories imported from an external device, are enabled.

3.2 Process Flow

Figure 20:
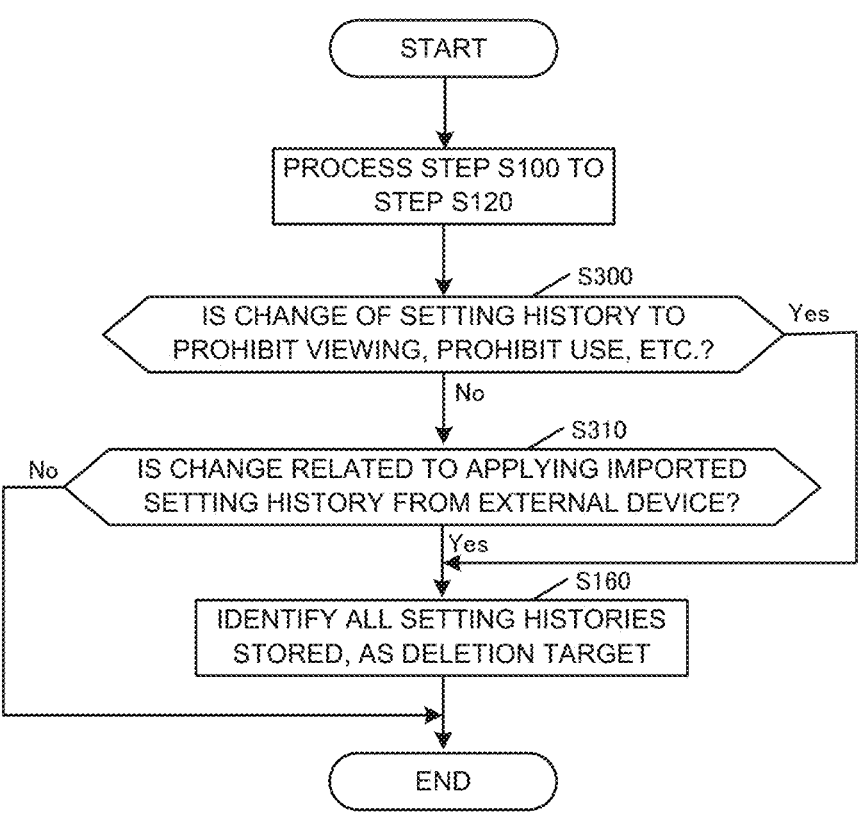
FIG. 20 is a flowchart illustrating a process flow according to the third embodiment.

Next, a process flow according to the third embodiment is described with reference to a flowchart illustrated in FIG. 20. FIG. 20 is a flowchart explaining the process of identifying all setting histories stored, as the deletion target. The controller 11 executes the process described with FIG. 20 by reading the overall settings determination program 531.

The process from step S100 to step S120 described with FIG. 6 are common steps, and the description thereof will be omitted here.

The controller 11 determines whether the setting histories are changed to the settings related to restrictions of use of the setting histories, such as prohibitions of viewing or utilization (use) (step S300).

If it is determined that the setting histories are changed to the settings related to restrictions of use of the setting histories, such as prohibitions of viewing or utilization (use), the controller 11 identifies all setting histories stored as the deletion target (step S300; Yes→step S160).

If it is determined that the setting histories are not changed to the settings related to restrictions of use of the setting histories, such as prohibitions of viewing or utilization (use), the controller 11 determines whether change is related to applying the setting histories imported from the external device (step S300; No→step S310).

If it is determined that the change is related to applying the setting histories imported from the external device, the controller 11 identifies all setting histories stored, as the deletion target (step S310; Yes→step S160). On the other hand, if it is determined that the change is not related to applying the setting histories imported from the external device (step S310; No), the controller 11 ends the process.

The change of settings in the steps S300 and S310 may not intend to delete the setting histories. In this case, the deletion execution check screen asking whether to delete the setting histories should be displayed on the display 13.

In addition, for example, if the change is to resume the setting histories to the factory default settings, there is a high possibility that the change does not intend to delete the setting histories, so that the deletion execution check screen should also preferably be displayed on the display 13 asking whether to delete the setting histories.

As described above, the third embodiment allows the deletion control of the setting histories by reflecting the state in which the overall settings applied to all users are effective, thus achieving more flexible deletion control of the setting histories.

4 Fourth Embodiment

A fourth embodiment can set a deletion timing of the setting histories in the first to third embodiments.

The functional settings and the process flow of the fourth embodiment can be implemented in the same manner as the first to third embodiments, and the description thereof will be omitted here.

4.1 Operation Example

Figure 21A:
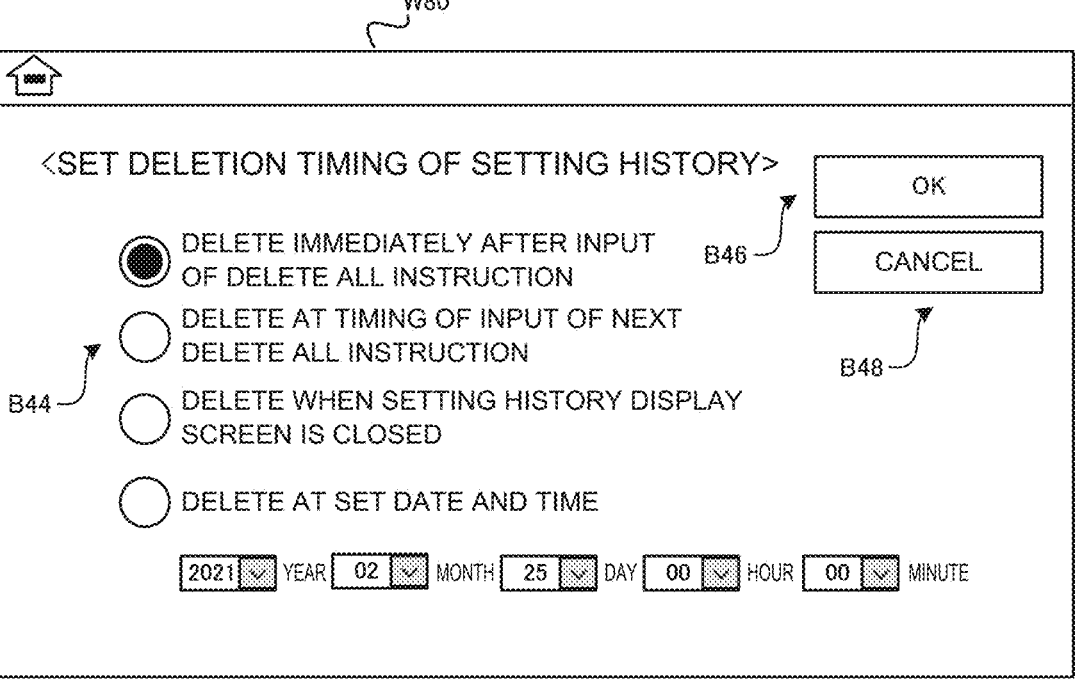
FIGS. 21A and 21B are views each illustrating an operation example according to a fourth embodiment.

FIG. 21A is an example structure of a deletion timing setting screen W80 for the setting histories. The deletion timing setting screen W80 for the setting histories includes a selection button B44 for setting the deletion timing of the setting histories, an OK button B46, and a cancel button B48.

The selection button B44 is a button that accepts input to select the deletion timing of the setting histories. FIG. 21A illustrates an example of allowing selection of the deletion timing of the setting histories, such as "delete immediately after input of the delete all instruction", "delete at next timing of input of the delete all instruction", "delete when the setting history display screen is closed", or "delete at set date and time".

The OK button B46 is a button that accepts the input of instruction of the selection result of the selection button B44. The cancel button B48 is a button that accepts a cancellation instruction of the selection result of the selection button B44.

Figure 21B:
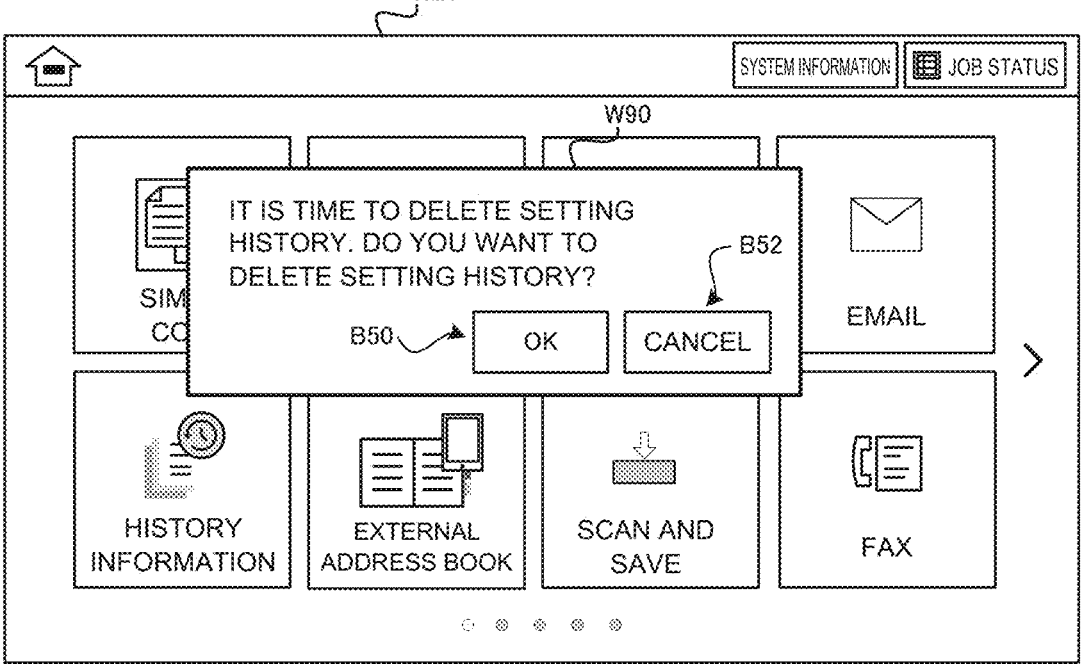

FIG. 21B is an example of a deletion execution check screen W90 asking whether to delete the setting histories displayed on the home screen W20 when it is time for deleting the setting histories selected in FIG. 21A. The user taps the OK button B50 if the user permits the deletion of the setting histories in accordance with a checking message displayed on the deletion execution check screen W90 illustrated in FIG. 21B. On the other hand, if the user does not permit the deletion of the setting histories, the user can cancel the deletion control of the setting history by tapping the cancel button B52.

As described above, the fourth embodiment allows setting the deletion timing of the setting histories at any given time, thus achieving more flexible deletion control of the setting histories in addition to the effects of the first to third embodiments.

The present disclosure is not limited to the above-described embodiments, and various changes can be made thereto. Specifically, the technical scope of the present disclosure also includes embodiments obtained by combining technical measures that are modified as appropriate without departing from the scope of the present disclosure.

Although the embodiments described above have been described separately for convenience of explanation, it is indeed possible to combine and implement the embodiments within the technically possible range.

The programs that operates in each apparatus of the embodiments are the programs that control the CPU or the like (the programs that make the computer function), thus implementing the functions of the above-described embodiments. The information handled by the apparatuses is temporarily stored in the temporary memory (for example, RAM) during the process, and then stored in various types of read-only memories (ROM), HDD, or other storage devices, so that the information can be read, modified, and written as necessary by the CPU.

Here, a recording medium that stores the programs may be, for example, any one of a semiconductor medium (for example, a ROM, a non-volatile memory card, or the like), an optical recording medium/magneto-optical recording medium (for example, a digital versatile disc (DVD), a magneto optical disc (MO), a Mini Disc (MD), a compact disc (CD), a Blu-ray (registered trademark) Disc (BD), or the like), and a magnetic recording medium (for example, a magnetic tape, a flexible disc, or the like). The functions of the present disclosure may also be realized not only by executing the loaded programs, but also processing in cooperation with the operating system, other application programs, or the like in accordance with the instructions of the programs.

To enable distribution in the market, the programs may be stored in a portable recording medium for distribution or transferred to a server computer connected via a network such as the Internet. In that case, a storage device of the server computer is indeed included in the present disclosure.

What is claimed is:

1. An image processing apparatus, comprising:
a storage capable of storing a setting history of a job related to image processing; and
a controller that accepts a deletion request of the setting history, wherein:
when the deletion request of the setting history is accepted, the controller identifies the setting history to be deleted, as a deletion target, based on whether a user authentication function is effective, and performs a deletion control of the identified setting history,
when the user authentication function is effective, the controller identifies the setting history of the job executed by a user, as the deletion target, and
when the user authentication function is ineffective, the controller identifies all of a plurality of setting histories stored, including the setting history, as the deletion target.

2. The image processing apparatus according to claim 1, wherein
when the user authentication function is effective and the user, who has made the deletion request of the setting history, has an administrator authorization, the controller identifies all of the plurality of setting histories stored, as the deletion target.

3. The image processing apparatus according to claim 1, wherein
when a specific setting is applied to the setting history, the controller requests the user whether to delete the setting history before the deletion control of the setting history.

4. The image processing apparatus according to claim 3, wherein
the specific setting applied to the setting history is a setting provided by the user.

5. The image processing apparatus according to claim 4, further comprising:
a display capable of displaying the plurality of setting histories, wherein
the specific setting is a setting to fix the displaying of the setting history on the display.

6. The image processing apparatus according to claim 5, wherein when the user authentication function is effective, a number of items of the setting history fixedly displayed on the display differs before and after a user authentication.

7. The image processing apparatus according to claim 5, wherein
when the setting to fix the displaying of the setting history on the display is applied, the controller sets a priority of the plurality of setting histories to be removed from the deletion target.

8. The image processing apparatus according to claim 7, wherein
the priority is determined based on a number of times the setting history is referenced or a last reference date and a last reference time.

9. The image processing apparatus according to claim 1, wherein
when overall settings to be applied to all users are effective, the controller identifies all of the plurality of setting histories stored, as the deletion target, regardless of whether the user authentication function is effective.

10. The image processing apparatus according to claim 9, wherein
the overall settings are settings related to a restriction of use of the setting history.

11. The image processing apparatus according to claim 9, wherein
the overall settings are settings related to applying the setting history imported from an external device.

12. A method for controlling deletion of a setting history, the method comprising:
storing a setting history of a job related to image processing;
controlling to accept a deletion request of the setting history;
when the deletion request of the setting history is accepted, identifying the setting history to be deleted, as a deletion target, based on whether a user authentication function is effective, and performing a deletion control of the identified setting history;
when the user authentication function is effective, identifying the setting history of the job executed by a user, as the deletion target; and
when the user authentication function is ineffective, identifying all of a plurality of setting histories stored, including the setting history, as the deletion target.

* * * * *